United States Patent
Ohtani et al.

(10) Patent No.: US 10,414,884 B2
(45) Date of Patent: *Sep. 17, 2019

(54) CARBON FIBER BUNDLE FOR RESIN REINFORCEMENT, AND METHOD FOR MANUFACTURING CARBON FIBER BUNDLE FOR RESIN REINFORCEMENT, CARBON-FIBER-REINFORCED THERMOPLASTIC RESIN COMPOSITION, AND MOLDED BODY

(71) Applicant: Mitsubishi Chemical Corporation, Tokyo (JP)

(72) Inventors: Tadashi Ohtani, Toyohashi (JP); Atsushi Takahashi, Toyohashi (JP); Saki Fujita, Otake (JP); Akira Harada, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,711

(22) Filed: Oct. 31, 2017

(65) Prior Publication Data

US 2018/0051143 A1 Feb. 22, 2018

Related U.S. Application Data

(63) Continuation of application No. 15/122,275, filed as application No. PCT/JP2015/056485 on Mar. 5, 2015, now Pat. No. 9,834,650.

(30) Foreign Application Priority Data

Mar. 5, 2014 (JP) ................ 2014-043336

(51) Int. Cl.
| | |
|---|---|
| *C08J 5/06* | (2006.01) |
| *D06M 13/17* | (2006.01) |
| *D06M 13/224* | (2006.01) |
| *D06M 15/227* | (2006.01) |
| *D06M 15/263* | (2006.01) |
| *D06M 15/53* | (2006.01) |
| *D06M 15/564* | (2006.01) |
| *C08J 5/24* | (2006.01) |
| *D06M 15/59* | (2006.01) |
| *D06M 15/285* | (2006.01) |
| *C08J 5/04* | (2006.01) |
| *C08K 7/06* | (2006.01) |
| *C08K 9/04* | (2006.01) |
| *B29B 15/12* | (2006.01) |
| *C08F 255/02* | (2006.01) |
| *D06M 101/40* | (2006.01) |
| *C08L 23/10* | (2006.01) |

(52) U.S. Cl.
CPC ............ *C08J 5/06* (2013.01); *B29B 15/122* (2013.01); *C08F 255/02* (2013.01); *C08J 5/042* (2013.01); *C08J 5/24* (2013.01); *C08K 7/06* (2013.01); *C08K 9/04* (2013.01); *D06M 13/17* (2013.01); *D06M 13/224* (2013.01); *D06M 15/227* (2013.01); *D06M 15/263* (2013.01); *D06M 15/285* (2013.01); *D06M 15/53* (2013.01); *D06M 15/564* (2013.01); *D06M 15/59* (2013.01); *C08J 2300/22* (2013.01); *C08J 2323/00* (2013.01); *C08J 2323/12* (2013.01); *C08J 2377/00* (2013.01); *C08J 2433/24* (2013.01); *C08J 2451/06* (2013.01); *C08J 2471/02* (2013.01); *C08L 23/10* (2013.01); *D06M 2101/40* (2013.01); *D06M 2200/50* (2013.01)

(58) Field of Classification Search
CPC .. C08F 255/02; C08J 5/06; C08J 5/042; C08J 5/24; C08K 7/06; C08K 9/04; D06M 13/17; D06M 13/224; D06M 15/227
USPC .......................................................... 523/222
See application file for complete search history.

(56) References Cited

U.S. PATENT DOCUMENTS

| 9,731,440 B2 | 8/2017 | Honma et al. | |
| 9,834,650 B2 * | 12/2017 | Ohtani ................ | C08J 5/06 |
| 10,066,337 B2 * | 9/2018 | Sakata ................ | C08J 5/06 |
| 2009/0143524 A1 | 6/2009 | Nakayama et al. | |

(Continued)

FOREIGN PATENT DOCUMENTS

| EP | 2371505 A1 | 10/2011 |
| JP | 2002-088656 A | 3/2002 |

(Continued)

OTHER PUBLICATIONS

International Search Report issued in corresponding International Patent Application No. PCT/JP2015/056485 dated Jun. 2, 2015.

(Continued)

*Primary Examiner* — Hannah J Pak

(74) *Attorney, Agent, or Firm* — Morgan, Lewis & Bockius LLP

(57) ABSTRACT

A carbon fiber bundle for resin reinforcement, wherein there are adhered by 0.1-5.0 mass % to a carbon fiber bundle in which multiple lengths of filament are bundled, a mixture created by mixing an organic polymer (A) having a mass-average molecular weight of 10000 or more and an organic compound (B) the thermal reduction rate specified in claim 1 of which is 5 mass % or more or an organic compound (B) the thermal reduction rate specified in claim 2 of which is 0.8 mass % or more, the amount of the organic polymer (A) adhered being 0.1 mass % or more.

19 Claims, 1 Drawing Sheet

(56) References Cited

U.S. PATENT DOCUMENTS

2011/0257325  A1   10/2011  Asami
2012/0015186  A1    1/2012  Honma et al.
2013/0123407  A1    5/2013  Hashimoto et al.

FOREIGN PATENT DOCUMENTS

| JP | 2006-077334 A | 6/2006 |
| JP | 2006-233346 A | 9/2006 |
| JP | 2010-149353 A | 7/2010 |
| JP | 2011-021281 A | 2/2011 |
| JP | 2012-007280 A | 1/2012 |
| JP | 2013-119684 A | 6/2013 |
| JP | 2013-119686 A | 6/2013 |
| WO | 2010/074118 A1 | 7/2010 |
| WO | 2012/017877 A1 | 2/2012 |
| WO | 2014/038574 A1 | 3/2014 |

OTHER PUBLICATIONS

Office Action issued in corresponding Japanese Patent Application No. 2015-043870, dated Oct. 30, 2018 (machine translation provided).
Notification issued in corresponding Japanese Patent Application No. 2015-043870, dated Mar. 19, 2019.
Notification issued in corresponding Japanese Patent Application No. 2015-043870, dated Mar. 26, 2019.
Office Action in corresponding Japanese Application No. 2015-043870 dated Jul. 2, 2019 along with a machine translation of same.

* cited by examiner

CARBON FIBER BUNDLE FOR RESIN REINFORCEMENT, AND METHOD FOR MANUFACTURING CARBON FIBER BUNDLE FOR RESIN REINFORCEMENT, CARBON-FIBER-REINFORCED THERMOPLASTIC RESIN COMPOSITION, AND MOLDED BODY

TECHNICAL FIELD

The present invention relates to a carbon-fiber bundle for resin reinforcement to be used as reinforcing material for thermoplastic resins and its manufacturing method. The present invention also relates to a method for manufacturing a carbon-fiber-reinforced thermoplastic resin composition using such a carbon-fiber bundle for resin reinforcement and to a method for manufacturing a molded product from the composition.

The present application is based upon and claims the benefit of priority to Japanese Patent Application No. 2014-043336, filed Mar. 5, 2014. The entire contents of the application are incorporated herein by reference.

BACKGROUND ART

A carbon-fiber bundle is formed with multiple carbon-fiber filaments containing carbon as a main component (the component contained in the largest amount). When carbon-fiber-reinforced thermoplastic compositions are formed using such carbon-fiber bundles as reinforcing material for thermoplastic resin, carbon-fiber bundles chopped into sections 3~15 mm long have been often used. However, in recent years, use of carbon-fiber bundles in the form of continuous fibers is growing in popularity because of high strength utilization rates.

When carbon-fiber bundles in the form of continuous fibers are aligned unidirectionally or woven into a cloth and impregnated with thermoplastic resins to make sheet materials or long-fiber pellets, handling such carbon-fiber bundles is not easy since they tend to become fuzzy or loose during a manufacturing process. When carbon-fiber bundles are used as woven material, whether the carbon-fiber bundles are suitable for being woven into a fabric, whether the woven fabric is easy to handle, and the like are important determinants.

For the reasons described above, to enhance processability of carbon-fiber bundles and physical properties of materials formed with carbon-fiber bundles blended therein, sizing treatment has been conventionally conducted to cause convergence of carbon-fiber bundles. As for sizing treatment, for example, a sizing agent such as polymer material that is compatible with the thermoplastic resin used as the matrix resin is provided on the surface of a carbon-fiber bundle in an approximate amount of 0.2~5 mass % of the carbon-fiber bundle. Polyolefin resins, polyamide resins, polyester resins and the like are often used as polymer material.

However, since such polymer material is solid at room temperature, when used as a sizing agent by itself, its processability, such as ease of winding or opening fibers required especially for carbon-fiber bundles to be used in the form of continuous fibers, will remain low.

Thus, as an example of a sizing agent that provides excellent processability to carbon-fiber bundles while being compatible with the thermoplastic resin, Patent Literature 1 describes a polymer material mixture of acid-modified polyolefin and a glycol ether-based compound.

Patent Literature 2 describes an example of a sizing agent, formed by mixing acid-modified polyolefin containing an aromatic vinyl compound as its copolymer component and a nonionic surfactant in the form of liquid at 20° C.

Moreover, Patent Literature 3 describes a mixture of polyamide and a nonionic surfactant in the form of liquid at 20° C. as an example where a polymer material other than olefin-based polymers is used as a sizing agent.

PRIOR ART LITERATURE

Patent Literature

Patent Literature 1: JP2012-7280A
Patent Literature 2: JP2013-119684A
Patent Literature 3: JP2013-119686A

SUMMARY OF THE INVENTION

Problems to be Solved by the Invention

Regarding the adhesiveness of carbon fibers and the matrix resin, Patent Literature 1 describes the content of a glycol ether-based compound contained in the sizing agent, which is preferred to be no greater than 20 parts by mass relative to 100 parts by mass of polyolefin from the viewpoint of adhesiveness. However, although such a setting prevents fuzzy fibers caused by scuffing, it is not enough to open fibers sufficiently.

Also, Patent Literatures 2 and 3 show nonionic surfactants contained in sizing agents being capable of providing properties for the fibers to open well, but show that the surfactant content exceeding a certain level may reduce the mechanical characteristics of various materials formed by using carbon-fiber bundles with the sizing agents applied thereon.

The present invention was carried out considering the above problems. The objective of the present invention is to provide carbon-fiber bundles for resin reinforcement and its manufacturing method, more specifically, to provide carbon-fiber bundles capable of expressing excellent interfacial adhesion properties with the thermoplastic resin in a carbon-fiber-reinforced thermoplastic resin composition, while exhibiting sufficient processability represented by excellent fiber-opening properties without reducing mechanical characteristics of the carbon-fiber-reinforced thermoplastic resin composition.

In addition, another objective of the present invention is to provide a method for manufacturing a carbon-fiber-reinforced thermoplastic resin composition formed by using the above carbon-fiber bundles for resin reinforcement and a method for manufacturing molded products using the composition.

Solutions to the Problems

The present invention includes the following aspects.
[1] A carbon-fiber bundle for resin reinforcement, the carbon-fiber bundle being formed with multiple converged filaments, where a mixture, containing an organic polymer substance (A) with a weight-average molecular weight of 10000 or greater and an organic compound (B) with a thermal loss rate of 5 mass % or greater when determined under the measurement condition below, is adhered at 0.1~5.0 mass % of the total mass of the carbon-fiber bundle for resin reinforcement, and the adhered amount of the organic polymer substance (A) is 0.1 mass % or greater of the total mass of the carbon-fiber bundle for resin reinforcement.

<Condition for Measuring Rate of Thermal Loss>

In a cylindrical container (bottom diameter: 50 mm, height: 10 mm), $W_0$ (g) of a test sample is weighed and heated at 200° C. for 10 minutes in an air flow of 50 L (volume at 25° C. under 1 atmospheric pressure) per minute. After the thermal treatment, the solid content is weighed and set as $W_1$ (g), and the rate of thermal loss is calculated by the following formula.

(thermal loss rate(mass %))=[($W_0$−$W_1$)/$W_0$]×100

[2] A carbon-fiber bundle for resin reinforcement, the carbon-fiber bundle being formed with multiple converged filaments, where a mixture, containing an organic polymer substance (A) with a weight-average molecular weight of 10000 or greater and an organic compound (B) with a thermal loss rate of 0.8 mass % or greater when determined under the measurement condition below, is adhered at 0.1~5.0 mass % of the total mass of the carbon-fiber bundle for resin reinforcement, and the adhered amount of the organic polymer substance (A) is 0.1 mass % or greater of the total mass of the carbon-fiber bundle for resin reinforcement.

<Condition for Measuring Rate of Thermal Loss>

Under air atmosphere, $W_0$ grams of a test sample is heated at 20° C./min. and a thermal loss curve is prepared. Then, when the mass weighed at 150° C. is set as $W_1$ (g) and the mass weighed at 200° C. is set as $W_2$ (g), the rate of thermal loss is calculated by the following formula.

(thermal loss rate(mass %))=[($W_0$−$W_2$)/$W_0$]×100− [($W_0$−$W_1$)/$W_0$]×100

[3] The carbon-fiber bundle for resin reinforcement described in [1] or [2], in which the amount of organic compound (B) adhered onto the carbon fiber is 0.2~4.0 mass % of the total mass of the carbon-fiber bundle for resin reinforcement.

[4] The carbon-fiber bundle for resin reinforcement, described in any of [1]~[3], in which [mass of organic polymer substance (A)]:[mass of organic compound (B)] in the mixture is set to have a mass ratio of 8.5:1.5~2:8.

[5] The carbon-fiber bundle for resin reinforcement described in any of [1]-[4], in which the main chain of the organic polymer substance (A) is in a carbon-carbon single bond structure.

[6] The carbon-fiber bundle for resin reinforcement described in any of [1]~[4], in which the organic polymer substance (A) is at least one selected from among modified polyolefin containing an acid group on its side chain, and (meth)acrylic copolymers.

[7] The carbon-fiber bundle for resin reinforcement described in any of [1]~[4], in which the organic polymer substance (A) is water soluble and/or self emulsifiable.

[8] The carbon-fiber bundle for resin reinforcement described in any of [1]~[7], in which the viscosity of the organic compound (B) at 30° C. is set at 2500 Pas or lower.

[9] The carbon-fiber bundle for resin reinforcement described in any of [1]~[8], in which the organic compound (B) is a polyether-based surfactant.

[10] The carbon-fiber bundle for resin reinforcement described in any of [1]~[8], in which the organic compound (B) is a lower alcohol ester of lower fatty acid.

[11] The carbon-fiber bundle for resin reinforcement described in any of [1]~[8], in which the organic compound (B) is a urethane resin.

[12] A manufacturing method of the carbon-fiber bundle for resin reinforcement described in any of [1]~[11], including a step for bringing the carbon-fiber bundle into contact with an aqueous dispersion or solution containing the organic polymer substance (A) and the organic compound (B), and a step for removing the solvent by applying heat in a range of 110° C.~180° C.

[13] A method for manufacturing a carbon-fiber-reinforced thermoplastic resin composition, including a step for opening the carbon-fiber bundle for resin reinforcement described in any of [1]~[11], followed by a step for impregnating the carbon-fiber bundle by bringing it into contact with a thermoplastic resin (C) heated at 180° C. or higher.

[14] The method for manufacturing a carbon-fiber-reinforced thermoplastic resin composition described in [13], in which the thermoplastic resin (C) is at least one resin selected from among polyolefins and polyamides.

[15] A method for manufacturing a carbon-fiber-reinforced thermoplastic resin molded body, including a step for heating at 200° C. or higher the carbon-fiber-reinforced thermoplastic resin composition obtained by the manufacturing method described in [13] or [14].

Effects of the Invention

According to the present invention, a carbon-fiber bundle for resin reinforcement and its manufacturing method are provided. The carbon-fiber bundle with an adhered sizing agent is capable of achieving interfacial adhesion with thermoplastic resin as well as excellent processability when forming a carbon-fiber-reinforced thermoplastic resin composition without causing a reduction in mechanical characteristics of the composition. In addition, according to the present invention, a carbon-fiber-reinforced thermoplastic resin composition and its molded body are provided using the carbon-fiber bundle.

MODE TO CARRY OUT THE INVENTION

Figure 1:
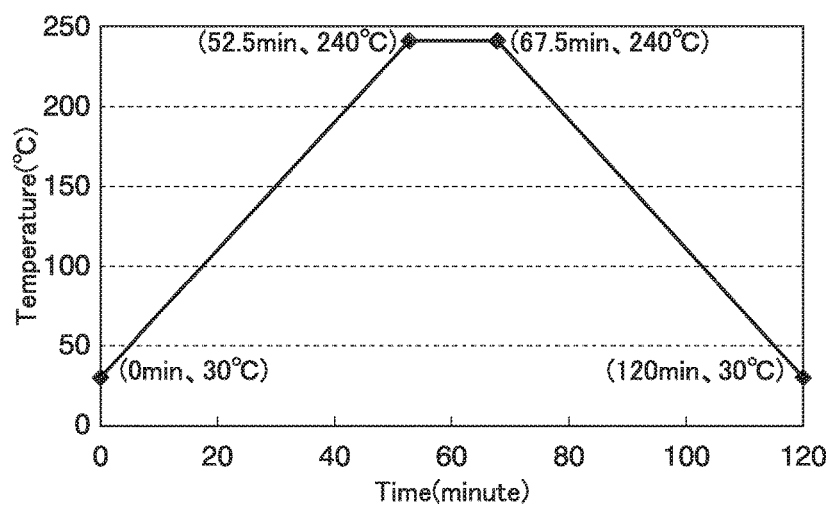
FIG. 1 is a graph showing conditions of raising/lowering the temperature for autoclave molding in Example 1.

In the following, the present invention is described in detail. However, descriptions of the elements provided below only exemplify the aspects of the present invention and do not limit the scope of the present invention. In the present application, the symbol means to include the numbers or the like that appear before and after the symbol.

<<Carbon-Fiber Bundle for Resin Reinforcement>>

The carbon-fiber bundle for resin reinforcement related to the present invention is formed by adhering a mixture containing a later-described organic polymer substance (A) and organic compound (B) onto a carbon-fiber bundle formed by the convergence of multiple filaments at 0.1~5.0 mass % of the total mass of the carbon-fiber bundle for resin reinforcement. Also, the adhered amount of the organic polymer substance (A) is set at 0.1 mass % or greater relative to the total mass of the carbon-fiber bundle for resin reinforcement.

<Mixture>

In the present invention, the mixture to be adhered onto a carbon-fiber bundle (hereinafter may also be referred to as a "sizing agent") contains an organic polymer substance (A)

with a weight-average molecular weight of 10000 or greater and an organic compound (B) that satisfies either rate of thermal loss obtained by the two conditions specified below.
Measurement Condition 1:

$W_0$ (g) of a test sample (mass, unit: g) is weighed and put into a cylindrical container (bottom diameter: 50 mm, height: 10 mm), and heated at 200° C. for 10 minutes in an air flow of 50 L (volume at 25° C. under 1 atmospheric pressure) per minute. After the thermal treatment, when the solid content is weighed and set as $W_1$ (mass, unit: g), the rate of thermal loss calculated by the following formula is 5 mass % or greater.

(thermal loss rate(mass %))=[$(W_0-W_1)/W_0$]×100

Measurement Condition 2:

Under air atmosphere, $W_0$ (mass, unit: g) of a test sample is heated at 20° C./min. and a thermal loss curve is prepared. When the mass measured at 150° C. is set as $W_1$ (mass, unit: g) and the mass at 200° C. is set as $W_2$ (mass, unit: g), the rate of thermal loss calculated by the following formula is 0.8 mass % or greater.

(thermal loss rate(mass %))=[$(W_0-W_2)/W_0$]×100− [$(W_0-W_1)/W_0$]×100

<Organic Polymer Substance (A)>

In the present invention, the mixture adhered onto a carbon-fiber bundle (sizing agent) contains an organic polymer substance (A) with a weight-average molecular weight of 10000 or greater. The organic polymer substance (A) helps achieve interfacial adhesion between the carbon-fiber bundle for resin reinforcement and a thermoplastic resin as the matrix resin. Considering the interfacial adhesion, the lower limit of the weight-average molecular weight is 10000. The upper limit of the weight-average molecular weight is not set in particular, but it is preferred to be 200000 or lower, at which it is easier to disperse or dissolve the substance in water, since organic polymer substance (A) is formed into an aqueous dispersion or solution when manufacturing a later-described carbon-fiber bundle for resin reinforcement. The weight-average molecular weight is preferred to be 12000~200000, more preferably 50000~180000.

In the present application, a "weight-average molecular weight" is obtained by using gel permeation chromatography (GPC) and by converting the molecular weight in terms of polystyrene.

The main chain of the organic polymer substance (A) is where covalent bonding is continuous and longest in the molecular structure. Examples of bonding in the main chain of a polymer are carbon-carbon single bonds, carbon-carbon double bonds, carbon-carbon triple bonds, ester bonds, ether bonds, urethane bonds, amide bonds, imide bonds and the like. The main chain of the organic polymer substance (A) in the present invention is preferred to be structured with carbon-carbon single bonds, considering processability, chemical stability, and compatibility with various matrix resins of the obtained substance.

Examples of the organic polymer substance (A) are as follows: modified polyolefin having a main chain in a carbon-carbon single bond structure; (meth)acrylic copolymer; modified polyamide having a main chain in an amide bond structure; polyester having a main chain in an ester bond structure; polyimide having a main chain in an imide bond structure; modified cellulose having a main chain in an ether bond structure; and so on. From the viewpoints of processability and affinity for the matrix resin of a carbon-fiber bundle with an adhered sizing agent, aliphatic compounds are preferred. Moreover, from the viewpoint of interfacial adhesion with the carbon-fiber bundle for resin reinforcement, the substance (A) is preferred to be at least one type selected from among modified polyolefins having an acidic group on the side chain and (meth)acrylic polymers. The following are descriptions of acid-modified polyolefin (A1) as a preferred example of acid-modified polyolefin, and (meth)acrylic copolymer (A4) as a preferred (meth)acrylic polymer.

<Acid-Modified Polyolefin (A1)>

The acid-modified polyolefin (A1) related to the present invention is formed to have a polyolefin structure (a1) and an acidic group (a2). The polyolefin structure (a1) is a substructure derived from polyolefin (a1-1) when polyolefin (a1-1) is modified with acid (a2-1), and the acidic group (a2) is a substructure derived from acid (a2-1).

Polyolefin Structure (a1)

The polyolefin (a1-1) of the polyolefin structure (a1) is not limited specifically, and any known polyolefin in the field of carbon fibers may be used. However, it is preferred to be appropriately selected according to the matrix resin used in a carbon-fiber-reinforced thermoplastic resin composition. Polyolefin (a1-1) may be formed with one type, or two or more types may be combined.

For example, when the matrix resin is a polyolefin-based resin (especially a polypropylene-based resin) having at least a polyolefin structure, a propylene homopolymer (polypropylene) and a copolymer of propylene and another olefin excluding propylene (propylene-olefin copolymer) may be used for polyolefin (a1-1).

Olefins other than propylene may be used alone or in combination thereof. Examples of olefins other than propylene are α-olefins (in the present invention, ethylene is one of α-olefins). Examples of α-olefins are ethylene, 1-butene, 1-pentene, 1-hexene, 1-heptene, 1-octene, cyclopentene, cyclohexene, norbornene and the like. Among them, olefins other than propylene are preferred to be C2~C6 α-olefins from the viewpoint of solubility in a resin solvent, and ethylene and 1-butene are more preferable from the viewpoint of the melt viscosity of the resin.

When a propylene homopolymer is used as polyolefin (a1-1), it is preferred to use a stereoblock polypropylene polymer having isotactic blocks and atactic blocks from the viewpoint of solubility in a solvent. Here, considering the processability depending on the level of crystallinity of a polypropylene homopolymer and its acid-modified polypropylene, the monomer unit for isotactic blocks is preferred to be contained in a range of 20 mol %~70 mol % relative to the total molar number of the monomer unit for the propylene homopolymer. On the other hand, considering the mechanical characteristics of the carbon-fiber bundle for resin reinforcement, the monomer unit for atactic blocks is preferred to be contained in a range of 30 mol %~80 mol % relative to the total molar number of the monomer unit for the propylene homopolymer. The content percentage of each block in the polymer is determined by the $^{13}$C-NMR analysis.

In addition, when the aforementioned copolymer (such as propylene/α-olefin copolymer) is used as polyolefin (a1-1), the content of the propylene unit in the copolymer is preferred to be 50 mol % or greater, more preferably 70 mol % or greater, relative to the total molar number of the monomer units in the copolymer from the viewpoint of affinity for the matrix resin. However, the content of the propylene unit in the copolymer is less than 100 mol %. Here, the content of each unit in polyolefin (a1-1) is determined by conducting an NMR analysis.

In the present invention, as described above, polyolefin (a1-1) is preferred to be a stereoblock polypropylene polymer containing isotactic and atactic blocks, and/or a propylene/α-olefin copolymer containing the propylene unit at 50 mol % or greater relative to the total molar number of the monomer units in polyolefin (a1-1). Namely, polyolefin (a1-1) is preferred to be at least one type selected from among stereoblock polypropylene polymers containing isotactic and atactic blocks, and propylene/α-olefin copolymers containing the propylene unit at 50 mol % or greater.

Acidic Group (a2)

The acidic group (a2) is not limited specifically, but is preferred to be a carboxylic acid-derived group or a dicarboxylic anhydride-derived group. A carboxylic-acid derived group is formed from the carboxylic acid obtained when polyolefin having a polyolefin structure is modified with carboxylic acid. A dicarboxylic anhydride-derived group is formed from the dicarboxylic anhydride obtained when polyolefin having a polyolefin structure is modified with dicarboxylic anhydride.

Examples of carboxylic acid in the carboxylic acid-derived group are acrylic acid, methacrylic acid, maleic acid, itaconic acid, fumaric acid, and crotonic acid, half esters or half amides of unsaturated dicarboxylic acids, and the like.

In addition, examples of dicarboxylic anhydride in the dicarboxylic anhydride-derived group are maleic anhydride, itaconic anhydride and the like. A specific example of a dicarboxylic anhydride-derived group is represented by the following (maleic anhydride-derived group).

[Chem 1]

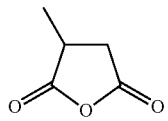

The acidic group (a2) in acid-modified polyolefin (A1) may be one type or multiple types.

As examples of the acid (a2-1) of acidic group (a2), acrylic acid, methacrylic acid, maleic acid, and maleic anhydride are preferred, and maleic anhydride is especially preferred from the viewpoint of reactivity with polyolefin (a1-1).

The acidic group (a2) may also be any acidic group other than carboxylic acid-derived group or dicarboxylic anhydride-derived group. Examples of acidic groups other than carboxylic acid-derived or dicarboxylic anhydride-derived group are a hydroxyl group, sulfo group, sulfino group, phosphono group, thiol group, phosphoric acid group and the like.

Composition of Acid-Modified Polyolefin (A1)

The acid-modified polyolefin (A1) used in the embodiments of the present invention has a polyolefin structure (a1) and acidic group (a2) at a mass ratio (a1):(a2) of 100:0.1~100:10. In the present application, the symbol "~" includes the values, ratios and the like provided before and after the symbol. When the mass ratio of polyolefin structure (a1) and acidic group (a2) is in such a range, the content of the polyolefin structure in acid-modified polyolefin is prevented from being significantly insufficient relative to the content of the acidic group. Accordingly, the interfacial adhesion between carbon fibers and thermoplastic resin (C) as the matrix resin will not be reduced. In addition, in acid-modified polyolefin (A1), the mass ratio of polyolefin structure (a1) and acidic group (a2) is preferred to be (a1):(a2)=100:0.5~100:7, from the same viewpoint described above.

The content of acidic group (a2) in acid-modified polyolefin (A1) is preferred to be set at 0.1 mass % or greater considering dispersability of organic polymer substance (A), and at 10 mass % or less considering compatibility with the matrix resin relative to the total mass of acid-modified polyolefin (A1). In particular, the content is more preferred to be 1~5 mass %. The content of each structure in acid-modified polyolefin (A) can be determined by performing infrared absorption spectroscopy (IR spectroscopy).

Acid-modified polyolefin (A1) may be structured with a polyolefin structure (a1) and an acidic group (a2). In addition, it may also contain a structure formed by a (meth)acrylic acid ester ((meth)acrylic acid ester unit) in the molecule.

The content and structure in acid-modified polyolefin (A1) are not particularly limited as long as a polyolefin structure (a1) and acidic group (a2) are included in the molecule. Examples of the acid-modified polyolefin (A1) are copolymers of polyolefin (a1-1) and acid (a2-1), more specifically, random copolymers, block copolymers and graft copolymers (copolymers through grafting).

The method for producing acid-modified polyolefin (A1) is not limited specifically; examples are melt-kneading polyolefin (a1-1) having the polyolefin structure (a1) and acid (a2-1) of the acidic group (a2), polymerizing those components in a solution of organic solvent, and the like. When those methods are employed, polymerization initiators such as organic peroxides and azo compounds may be used if applicable. Alternatively, acid-modified polyolefin (A1) may be formed by copolymerizing acid (a2-1) of the acidic group (a2) during the production process of polyolefin (a1-1).

Weight-Average Molecular Weight of Acid-Modified Polyolefin (A1)

The weight-average molecular weight (Mw) of acid-modified polyolefin (A1), measured by gel permeation chromatography (GPC) and converted using a calibration curve of standard polystyrene, is preferred to be 500,000 or lower, more preferably 200,000 or lower, from the viewpoint of providing excellent dispersability for the organic polymer substance (A).

In addition, the weight-average molecular weight (Mw) of acid-modified polyolefin (A1) is preferred to be 10,000 or greater. Such a setting provides excellent interfacial adhesion between carbon fibers and the thermoplastic resin matrix (that is, thermoplastic resin (C) contained in a later-described carbon-fiber-reinforced thermoplastic resin composition) and converging properties of the carbon-fiber bundle itself. In addition, when a sizing agent is adhered onto carbon fibers using aqueous resin dispersion, it is easier to emulsify the sizing agent in the aqueous resin dispersion, thus preventing the particle diameter in the aqueous resin dispersion from growing more than desired.

Also, the acid-modified polyolefin (A1) may be bonded with a hydrophilic polymer (A2) with a weight-average molecular weight (Mw) of 450 or greater.

(Hydrophilic Polymer (A2))

The hydrophilic polymer (hydrophilic polymer compound) (A2) used in the present invention is not limited to any particular type unless it causes a significant reduction in the effects of the present invention. For example, it may be any of synthetic polymers, semi-synthetic polymers and natural polymers. Among them, a synthetic polymer is preferred since it is easier to control hydrophilic properties and achieve consistent characteristics. Here, hydrophilic polymer (A2) means a polymer compound having an insoluble component at no greater than 1 mass % when it is dissolved in 25° C. water at a concentration of 10 mass %. In the embodiments of the present invention, a hydrophilic polymer (A2) with a weight-average molecular weight (Mw) of 450 or greater is used. When the Mw of a hydrophilic polymer is 450 or greater, the organic polymer substance (A) exhibits excellent emulsion stability when it is emulsified.

The hydrophilic polymer (A2) related to the present invention is not limited to any particular type as long as it reacts with acid-modified polyolefin (A1). The hydrophilic polymer (A2) may contain a reactive group (examples are hydroxyl group, epoxy group, primary~tertiary amino groups, isocyanate group or (meth)acryloyl group).

Examples of a synthetic polymer are acrylic resins such as poly(meth)acrylic resins, polyvinyl alcohol resins, polyvinyl pyrrolidone resins, polyethyleneimine resins, and polyether resins. Those hydrophilic polymers may be used alone or in combination thereof. Among them, the hydrophilic polymer is preferred to be polyetheramine (PEA) since the resultant organic polymer substance (A) is easily and stably dispersed in water. The polyetheramine is not particularly limited, as long as it contains a polyether structure and an amino group (any of primary to tertiary amino groups). Among them, polyetheramine, having a primary amino group ($—NH_2$) as a reactive group on either terminal or both terminals of a resin having a polyether structure as its main skeleton (main chain), is especially preferable because it is highly hydrophilic. Specific examples of polyetheramine are methoxy-poly(oxyethylene/oxypropylene)-2-propylamine, methoxy-poly(oxyethylene/oxybutene)-2-propylamine and the like.

Moreover, considering the emulsion stability of organic polymer substance (A) and the water resistance of carbon fibers for resin reinforcement, the weight-average molecular weight (Mw) of polyetheramine, determined by measuring through GPC and converting using the calibration curve of standard polystyrene, is preferred to be 500~3,000.

Examples of commercially available polyetheramine are M series and ED series of Jeffamine® made by Huntsman, and they are selected appropriately.

The organic polymer substance (A) related to the present invention is preferred to be a reaction product of the aforementioned acid-modified polyolefin (A1) and hydrophilic polymer (A2). The acid-modified polyolefin (A1) and hydrophilic polymer (A2) are preferred to be chemically bonded in organic polymer substance (A). In that case, acid-modified polyolefin (A1) and hydrophilic polymer (A2) are preferred to have a mass ratio (A1):(A2) of 100:1~100:100. Such a setting is capable of achieving both interfacial adhesion of carbon fibers to thermoplastic resin (C) and aqueous dispersion of organic polymer substance (A). Especially, by setting the mass ratio of hydrophilic polymer (A2) at the above upper limit or lower, the relative amount of acid-modified polyolefin (A1) increases in the organic polymer substance (A). Accordingly, even with a lower amount of organic polymer substance (A), the interfacial adhesion to thermoplastic resin (C) is effectively exhibited.

In addition, the mass ratio is preferred to be set at 100:2~100:30 from the same viewpoint as above.

In the above, the mass ratio of acid-modified polyolefin (A1) and hydrophilic polymer (A2) is determined by conducting $^1$H-NMR and $^{13}$C-NMR analysis on the organic polymer substance (A) so as to identify hydrogen atoms and carbon atoms derived from the hydrophilic polymer.

Organic polymer substance (A) is preferred to have a structure derived from acid-modified polyolefin (A1) and a structure derived from hydrophilic polymer (A2) at a specific mass ratio; however, how and where acid-modified polyolefin (A1) and hydrophilic polymer (A2) are bonded in organic polymer substance (A) are not particularly limited. For example, the bonding form may be ionic or covalent bonding. Organic polymer substance (A) is preferred to be a graft copolymer formed when hydrophilic polymer (A2) is graft bonded to acid-modified polyolefin (A1). If organic polymer substance (A) is set to be a graft copolymer, organic polymer substance (A) (a bonded substance) is efficiently manufactured by bonding acid-modified polyolefin (A1) to hydrophilic polymer (A2).

The method for synthesizing acid-modified polyolefin (A1) and hydrophilic polymer (A2) to obtain an organic polymer substance (A) is not particularly limited, and various reaction methods may be employed. For example, it is an option to react the acidic group (a2) of acid-modified polyolefin (A1) and the reactive group of hydrophilic polymer (A2). In such reactions, the acidic group in acid-modified polyolefin (A1) and a reactive group of hydrophilic polymer (A2) are bonded to form ionic or covalent bonding between them. Examples are esterification reaction between a carboxyl group as the acidic group and a hydroxyl group as the reactive group; ring opening reaction between a carboxyl group as the acidic group and an epoxy group as the reactive group; amidation reaction between a carboxyl group as the acidic group and a primary or binary amino group as the reactive group; quaternary ammonation reaction between a carboxyl group as the acidic group and a tertiary amino group as the reactive group; urethanation reaction between a carboxyl group as the acidic group and an isocyanate group as the reactive group; and the like. A reaction rate of 1~100% may be selected for each reaction; it is preferably 10~100%, more preferably 50~100%, considering the dispersability of organic polymer substance (A). In the present invention, when the acid (a2-1) of acidic group (a2) in acid-modified polyolefin (A1) is a diprotic acid or its anhydride, either one or both of the acidic groups of the diprotic acid may be reacted with hydrophilic polymer (A2).

(pH of Organic Polymer Substance (A))

When organic polymer substance (A) to be adhered onto carbon-fiber bundles is dispersed to have a solid component concentration of 30 mass %, the pH of the aqueous resin dispersion at 25° C. is preferred to be 6.0~10.0. When the pH is 6.0 or higher, it is easier to stabilize the aqueous resin dispersion of organic polymer substance (A), and agglomeration is thus easier to suppress from occurring. When the pH is 10.0 or lower, it is easier to prevent an increase in the viscosity of the dispersion of organic polymer substance (A), and a decrease in handling efficiency is easily prevented. When acidic group (a2) is consumed in reactions of acid-modified polyolefin (A1) and hydrophilic polymer (A2), and no acidic group (a2) remains at the stage of organic polymer substance (A), the above pH is usually in a range of 6.0~10.0. However, regardless of the presence of acidic group (a2) at the stage of organic polymer substance (A), if the above pH is not in a range of 6.0~10.0, the pH of organic polymer substance (A) to be adhered onto carbon-fiber bundles is preferred to be adjusted in such a range by using a basic substance (A3) below.

Adjusting pH of Organic Polymer Substance (A)

In the present invention, the pH of the aqueous resin dispersion of organic polymer substance (A) to be adhered onto carbon-fiber bundles can be adjusted using a basic substance (A3) as described above. Namely, a carbon-fiber bundle for resin reinforcement related to the present invention may be such a bundle to which organic polymer substance (A) and basic substance (A3) are adhered. In such a case, the organic polymer substance (A) and basic substance (A3) may form a salt and then be adhered onto a carbon-fiber bundle, or those substances may react with each other and then be adhered onto the carbon-fiber bundle.

As described above, when no acidic group (a2) is present at the stage of organic polymer substance (A), the aforementioned pH is normally in a range of 6.0~10.0. Accordingly, the following is a description of a case where acidic group (a2) remains at the stage of organic polymer substance (A).

In the above case, the acidic group (a2) in organic polymer substance (A) is neutralized by or reacted with a basic substance (A3). Therefore, in the present invention, organic polymer substance (A), which is neutralized by or reacted with the basic substance (A3), is adhered onto a carbon-fiber bundle for resin reinforcement. The amount of basic substance (A3) is determined to be such an amount, or greater, that is capable of neutralizing at least part of the acidic group (a2) remaining in organic polymer substance (A). During that process, the adhered amount (added amount) of basic substance (A3) is adjusted so that when organic polymer substance (A) neutralized by or reacted with basic substance (A3) is dispersed in water to prepare an aqueous resin dispersion at a solid component concentration of 30 mass %, the pH of the aqueous resin dispersion at 25° C. will be in a range of 6.0~10.0.

Basic Substance (A3)

A basic substance (basic compound) (A3) is not limited to any specific type as long as it is capable of adjusting the pH of organic polymer substance (A). Examples are alkali or alkaline earth metal salts such as sodium hydroxide and potassium hydroxide, ammonia, methylamine, ethylamine, propylamine, butylamine, hexylamine, octylamine, ethanolamine, propanolamine, diethanolamine, N,N-dimethyl-ethanolamine, dimethylamine, diethylamine, triethylamine, 2-methyl-2-amino-propanol, morpholine and the like. Among those basic substances, it is preferred to use a basic substance having a molecular weight of 100 or less. Using such a substance, it is easier to suppress lowered water resistance caused when the basic substance (A3) is bled out. The above-listed substance may be used alone or in combination thereof. In the present application, the molecular weight of basic substance (A3) is set to be a concept that includes a formula weight. For sodium hydroxide or potassium hydroxide, which do not exist as a molecule, the value expressed in the formula is set as its molecular weight. In addition, a hydrophilic polymer (A2) could be considered as a basic substance (A3), but such a substance in the present application is set as a hydrophilic polymer (A2) in the present application.

<(Meth)acrylic Copolymer (A4)>

A (meth)acrylic copolymer (A4) contains at least one group selected from among carboxyl groups, hydroxyl groups, amide groups, and polyether groups; has a radically polymerizable double bond; and is obtained by polymerizing a monomer having at least one group selected from among carboxyl groups, hydroxyl groups, amide groups, and polyether groups. (Meth)acrylic copolymer (A4) is preferred to contain at least one group selected from among carboxyl groups, hydroxyl groups, amide groups, and polyether groups, since such a structure is capable of achieving later-described water-soluble and/or self-emulsifiable properties.

The organic polymer substance (A) related to the present invention is preferred to be water soluble and/or self emulsifiable. If organic polymer substance (A) is water soluble and/or self emulsifiable, adding a surfactant that does not contribute to interfacial adhesion is not necessarily required when an aqueous dispersion or solution of organic polymer substance (A) is prepared during a process for manufacturing a carbon-fiber bundle for resin reinforcement. Accordingly, a carbon-fiber-reinforced thermoplastic resin composition exhibits even stronger interfacial adhesion between the carbon-fiber bundle for resin reinforcement and thermoplastic resin (C) as the matrix resin without lowering its mechanical characteristics.

Being "self emulsifiable" means a substance that does not need a surfactant to emulsify in water.

Being "water soluble" means when 90 grams of water and 10 grams of a substance are weighed and when the substance is dissolved in 90° C. water to have a 10 mass % concentration, the amount of insoluble component is 1 mass % of lower.

To provide water-soluble and/or self-emulsifiable properties to organic polymer substance (A), the acidic group in the molecular structure is neutralized by a later-described basic substance (A3), or a hydrophilic polymer is introduced in the molecular structure. Alternatively, it is an option for organic polymer substance (A) itself to be a hydrophilic polymer.

Examples of a hydrophilic polymer are acrylic resins such as poly(meth)acrylic resins, polyvinyl alcohol resins, polyvinylpyrrolidone resins, polyethyleneimine resins, polyether resins and the like.

The amount of organic polymer substance (A) to be adhered onto a carbon-fiber bundle is preferred to be at least 0.1 mass % of the total mass of a carbon-fiber bundle for resin reinforcement, considering the adhesiveness exhibited between the carbon-fiber bundle for resin reinforcement and the matrix resin. The amount is preferred to be no greater than 2.0 mass %, more preferably no greater than 1.0 mass %, even more preferably no greater than 0.5 mass %, considering the processability of the carbon-fiber bundle for resin reinforcement. In particular, the amount is preferred to be 0.1~2.0 mass %, more preferably 0.1~1.0 mass %, especially preferably 0.1~0.5 mass %.

<Organic Compound (B)>

In addition to organic polymer substance (A), the mixture adhered onto a carbon-fiber bundle related to the present invention contains an organic compound (B) having a rate of thermal loss determined by the above specified conditions.

When adhered onto a carbon-fiber bundle related to the present invention, organic compound (B) is present thinly on each of the individual filaments of the carbon-fiber bundle. Thus, if organic compound (B) has at least the rate of thermal loss determined under the aforementioned conditions, most of the compound (B) disappears by the heat in a high temperature setting during the manufacturing process of a carbon-fiber-reinforced thermoplastic resin composition. Namely, the carbon-fiber bundle for resin reinforcement related to the present invention exhibits excellent processability because of the organic compound (B) adhered onto the bundle. Moreover, the interfacial adhesion properties of organic polymer substance (A) for adhering the carbon-fiber bundle for resin reinforcement and thermoplastic resin (C) are not inhibited by organic compound (B), since no organic compound (B) remains in the carbon-fiber-reinforced thermoplastic resin composition manufactured using the carbon-fiber bundle of the present invention. As a result, the mechanical characteristics of the carbon-fiber-reinforced thermoplastic resin composition will not be lowered.

Considering the above viewpoints, the rate of thermal loss of organic compound (B) determined under the aforementioned condition 1 is preferred to be at least 5 mass %, more preferably at least 7 mass %. In addition, the thermal loss rate of organic compound (B) determined under the aforementioned condition 2 is preferred to be at least 0.8 mass %, more preferably at least 1 mass %.

No particular upper limit is specified for a rate of thermal loss determined under condition 2. However, to prevent thermal loss in organic compound (B) during a drying process, especially in a later-described method for manufacturing carbon-fiber bundles for resin reinforcement related to the present invention, the rate of thermal loss of organic compound (B) is preferred to be no greater than 2 mass %, more preferably no greater than 1 mass %, when organic compound (B) is treated at 100° C.~150° C. instead of 150° C.~200° C. under condition 2. The rate of thermal loss of organic compound (B) under a treatment conducted at 100° C.~450° C. is determined by the following condition.

<Determining Rate of Thermal Loss>

Under air atmosphere, a test sample $W_0$ (mass, unit: g) is heated at 20° C./min. and a thermal loss curve is prepared. Then, the mass measured at 100° C. is set as $W_1$ (mass, unit: g) and the mass measured at 150° C. is set as $W_2$ (mass, unit: g). The rate of thermal loss is calculated by the following formula.

(thermal loss rate(mass %))=[$(W_0-W_2)/W_0$]×100−[$(W_0-W_1)/W_0$]×100

Examples of organic compound (B) having potential characteristics as above are polyether-based surfactants, lower alcohol ester compounds of lower fatty acid, urethane resins and the like. Examples of a polyether-based surfactant are polyoxyethylene alkyl ether, polyoxyalkylene alkyl ether, polyoxyethylene polyoxypropylene alkyl ether, polyoxyethylene polyoxypropylene glycol, polyoxyethylene polyoxypropylene monobutyl ether, alkylamine EO adducts, alkyl diamine EO adducts, alkylamine EOPO adducts, alkylamido ether, polyoxyalkylene glycol, alkyl glucoside, amine oxide, and the like. Among them, substances with a relatively low molecular weight are more likely to be used as organic compound (B). Here, "EO" means an oxyethylene group, and "PO" means an oxypropylene group.

Specific examples of a lower alcohol ester compound of lower fatty acid are fatty acids such as caprylic acid, capric acid, lauric acid, myristic acid, palmitic acid, stearic acid, oleic acid, behenic acid and adipic acid; and esters of aliphatic alcohols such as methyl alcohol, isopropyl alcohol, n-butyl alcohol, isobutyl alcohol, n-octyl alcohol, 2-ethylhexyl alcohol, n-decyl alcohol, isodecyl alcohol, lauryl alcohol, isotridecyl alcohol, myristyl alcohol, cetyl alcohol, stearyl alcohol, octyldodecyl alcohol, glycerin, ethylene glycol, and propylene glycol. Among them, substances with a relatively low molecular weight are more likely to be used as organic compound (B).

In addition, a urethane resin formed using polyether or polyester as the polyol and an aromatic or aliphatic group as the isocyanate may be used. Especially, a urethane resin using polyether as its polyol is more likely to be used as organic compound (B).

In addition, to make a carbon-fiber bundle softer when adhered, the viscosity of organic compound (B) at 30° C. is preferred to be 2500 Pa·s or lower, more preferably 1000 Pa·s or lower, even more preferably 100 Pa·s or lower. Viscosity values are obtained by using a known rheometer or viscometer (for example, rotational viscometer).

Considering the processability of a carbon-fiber bundle, the amount of organic compound (B) relative to carbon fibers is preferred to be at least 0.1 mass %, more preferably at least 0.15 mass %, even more preferably at least 0.2 mass %, relative to the total mass of the carbon-fiber bundle for resin reinforcement. In addition, the amount is preferred to be no greater than 4.0 mass %, more preferably no greater than 1.0 mass %, since an amount exceeding that will cause the compound to remain even under high temperatures and to inhibit organic polymer substance (A) from adhering carbon fibers for resin reinforcement and matrix resin. Specifically, the amount is preferred to be 0.1~4.0 mass %, more preferably 0.15~3.0 mass %, even more preferably 0.2~1.0 mass %.

<Other Components>

The carbon-fiber bundle for resin reinforcement related to the present invention may have other substances (D) in addition to the aforementioned organic polymer substance (A) and organic compound (B) adhered onto the bundle.

Other substances (D) are epoxy resins, vinyl acetate resins, silane coupling agents, antistatic agents, lubricants, leveling agents, basic substances to neutralize the organic polymer substance when it is acidic, and the like. Examples of a basic substance are those listed above as basic substance (A3).

Organic polymer substance (A), organic compound (B) and substance (D) may be consecutively adhered onto a carbon-fiber bundle; substance (D) may be adhered after a mixture of organic polymer substance (A) and organic compound (B) is adhered; or an aqueous resin dispersion of each substance is prepared in advance and mixed together to prepare a sizing agent, and then the mixture may be adhered onto a carbon-fiber bundle.

Among the above, it is preferred to prepare in advance aqueous resin dispersions, which are then mixed and adhered onto a carbon-fiber bundle, since all the components will adhere to the carbon-fiber bundle homogeneously, and it is easier to control the amount of each adhered substance.

<Ratio of Organic Polymer Substance (A) and Organic Compound (B)>

Organic polymer substance (A) and organic compound (B) in a sizing agent (mixture) related to the present invention are preferred to have a mass ratio [mass of organic polymer substance (A)]:[mass of organic compound (B)] of 8.5:1.5~2:8. At a mass ratio in such a range, organic polymer substance (A) exhibits interfacial adhesion properties between carbon fibers and thermoplastic resin (C) (hereinafter may also be referred to as "matrix resin"), while organic compound (B) enhances the processability of carbon-fiber bundles. Moreover, such a ratio reduces the amount of organic compound (B) that remains when a later-described carbon-fiber-reinforced thermoplastic resin composition is formed. For the same reasons as above, a more preferable ratio is in a range of 7.5:2.5~3:7, even more preferably 7:3~4:6.

<Amount of Adhered Mixture>

The amount of sizing agent (mixture) adhered onto a carbon-fiber bundle for resin reinforcement (the amount contained in the bundle) may be set according to a molding method of a target composite material or its usage purposes. It is set to be 0.1 mass %~5.0 mass % relative to the total mass of a carbon-fiber bundle and the mixture (namely, the mass of a carbon-fiber bundle for resin reinforcement). When the amount of adhered sizing agent is in a range of 0.1 mass %~5.0 mass %, appropriate convergence is attained in the carbon-fiber bundle. Accordingly, the mixture is capable of providing processability during the molding process and interfacial adhesion between the carbon-fiber bundle and thermoplastic resin (C) (matrix resin) in a carbon-fiber-reinforced thermoplastic resin composition. In addition, from the above viewpoint, the amount of adhered sizing agent is preferred to be 0.15 mass %~1.8 mass %, more preferably 0.2 mass %~1.0 mass %, relative to the total mass of the carbon fiber bundle and the mixture. The amount of sizing agent (mixture) adhered onto the carbon-fiber bundle related to the present invention is determined by comparing the mass of a carbon-fiber bundle for resin reinforcement and the mass of the bundle after the sizing agent is removed. To remove a sizing agent, the polymer may be thermally decomposed at high temperature, or the polymer is dissolved in a solvent.

In the mixture adhered onto a carbon-fiber bundle for resin reinforcement related to the present invention, organic polymer substance (a) is preferred to be acid-modified polyolefin or (meth)acrylic polymer, while organic compound (B) is at least a compound selected from among polyether-based surfactants, lower alcohol esters of lower fatty acid, and urethane resins.

In the mixture adhered onto a carbon-fiber bundle for resin reinforcement related to the present invention, organic polymer substance (A) is preferred to be a maleic anhydride-modified propylene-butene copolymer, or a (meth)acrylic polymer obtained from hydroxyethyl acrylamide and acrylic acid, while organic compound (B) is at least a compound selected from among polyoxyethylene polyoxypropylene monobutyl ether, polyoxyethylene polyoxypropylene alkyl ether, and polyoxyethylene alkyl ether.

<Carbon-Fiber Bundle>

A carbon-fiber bundle to be adhered with the mixture as a sizing agent is not particularly limited and may be any known carbon-fiber bundle in the carbon-fiber field. A normal carbon-fiber bundle is structured by bundling 1,000~150,000 filaments with an average diameter of 5 μm~15 μm. Here, an average diameter R (μm) may be calculated using the formula below and by setting the number of filaments in a bundle as "N", basis weight (weight per unit length) as "M" (g/m), density "ρ" (g/cm³) when the cross section perpendicular to the fiber axis of a filament is assumed to be a circle.

$$R = 2000\sqrt{\frac{M}{\pi \rho N}}$$ [math 1]

The filaments of a carbon-fiber bundle are produced from acrylonitrile polymers (PAN-based polymers), petroleum- or coal-based pitch, rayon, lignin or the like when those materials are made into fibers and carbonized. PAN-based carbon fibers made from PAN-based polymers are preferred because of excellent industrial-scale productivity and mechanical characteristics. A PAN-based polymer is sufficient if it contains an acrylonitrile unit in its molecular structure, and may be homopolymers of acrylonitrile or a copolymer of acrylonitrile and other monomer (such as methacrylic acid). The content ratio of an acrylonitrile unit and other monomer unit in a copolymer may be appropriately set according to the characteristics of a target carbon-fiber bundle.

Filaments of a carbon-fiber bundle before the mixture (sizing agent) is adhered may have surface wrinkles. A surface wrinkle of a filament means a rough surface that shows a length of 1 μm or longer in a certain direction. The direction of wrinkles is not specifically limited, and it may be parallel, perpendicular or angular to the fiber axis.

Among the above, a carbon-fiber bundle without a polymer mixture adhered thereon is preferred to be formed by bundling filaments having multiple surface wrinkles such as follows: in a region of a circumferential length of 2 μm multiplied by a fiber-axis length of 1 μm, in other words, in a planar region of a filament partitioned by a circumferential length of 2 μm and a fiber-axis length of 1 μm, the height difference between the highest and lowest portions of a wrinkle is 40 nm or greater. Moreover, the height difference between the highest and lowest portions of a wrinkle is preferred to be no more than 10% of the average diameter of a filament from a viewpoint of stabilizing the manufacturing process of a carbon-fiber bundle for resin reinforcement. In particular, the height difference is preferred to be no greater than 1.5 μm. Examples of carbon-fiber bundles that satisfy such conditions are TR 50S, TR 30S, TRH 50, TRW 40, and MR 60H (product names) made by Mitsubishi Rayon, Co., Ltd.

When the above wrinkles are measured, any planar region may be selected from the carbon-fiber surface. Any portion of a carbon-fiber surface may be picked for measurement.

A carbon-fiber bundle prior to sizing treatment using the above mixture may be carbonized. Alternatively, a carbon-fiber bundle may be subjected to electrolytic oxidation treatment to introduce an oxygen-containing functional group (for example, carboxyl group) on its surface, or may be provided with another sizing agent (pre-sizing agent).

<<Method for Manufacturing Carbon-Fiber Bundle for Resin Reinforcement>>

A carbon-fiber bundle for resin reinforcement related to the present invention is obtained by adhering the above mixture as a sizing agent onto a carbon-fiber bundle prior to applying a sizing agent. The method for applying a sizing agent is not limited specifically; for example, a preferred method is to prepare a dispersion or solution of the above mixture (hereinafter may also be referred to as "sizing liquid"), and then bring a carbon-fiber bundle into contact with the liquid (hereinafter may also be referred to as "sizing treatment"). Here, a dispersion means a liquid in which the sizing agent is homogenized in a solvent as fine particles. Examples of a solvent for forming a solution or dispersion are water, ethanol, acetone and isopropyl alcohol, which are used alone or in combination thereof. Water is preferred to be contained at 50 mass % or greater. The concentration of sizing agent in a sizing liquid may be selected appropriately according to the state or type of a carbon-fiber bundle prior to applying a sizing agent, and a process for applying a sizing agent. More specifically, a touch-roll method is conducted by immersing part of a roller in a sizing liquid to surface transfer the liquid, and having a carbon-fiber bundle make contact with the roller; and an immersion method is conducted by immersing a carbon-fiber bundle directly in a sizing liquid. The amount of a sizing agent applied on a carbon-fiber bundle may be adjusted by modifying the concentration of the mixture in a sizing liquid, or by squeezing out the liquid. A sizing liquid is more preferred to be an aqueous dispersion or solution considering the ease of process management and safety. The method for preparing a sizing liquid is not limited specifically. For example, organic polymer substance (A) and organic compound (B) may each be made into an aqueous dispersion or solution and then be mixed, or organic polymer substance (A) and organic compound (B) may be mixed first and then made into an aqueous dispersion or solution. To prepare an aqueous dispersion, for example, organic polymer substance (A) and/or organic compound (B) are added to water, heated to a temperature at or higher than the melting point of the substances, stirred under high shear force conditions, and cooled.

After sizing treatment, drying treatment is preferred so as to remove the solvent. A drying process may be conducted by using a hot-air dryer, panel-heater dryer, muffle furnace, roll dryer or the like. To conduct heat drying, a carbon-fiber bundle with an applied sizing liquid is continuously passed through a dryer, and a carbon-fiber bundle with a sizing liquid applied thereon is wrapped on tubular members, which are then dried by batch using a hot-air dryer or a panel dryer. The drying process is preferred to be continuously conducted so that heat treatment is performed evenly.

To efficiently conduct a drying treatment process and to prevent thermal loss of organic compound (B), the temperature for drying treatment is preferred to be 110° C.~180° C., more preferably 120° C.~170° C.

The duration of the drying treatment is preferred to be 2 seconds~10 minutes, more preferably 5 seconds~5 minutes, from the same viewpoints as above.

<Carbon-Fiber-Reinforced Thermoplastic Resin Composition>

A carbon-fiber-reinforced thermoplastic resin composition related to the present invention is prepared by using a carbon-fiber bundle for resin reinforcement of the present invention and by employing a later-described production method.

<<Method for Manufacturing Carbon-Fiber-Reinforced Thermoplastic Resin Composition>>

A carbon-fiber bundle for resin reinforcement related to the present invention is preferred to be used to prepare a carbon-fiber-reinforced thermoplastic resin composition.

The carbon-fiber-reinforced thermoplastic resin composition prepared by using a carbon-fiber bundle for resin reinforcement may have known forms such as short-fiber compounds, long-fiber pellets, random mats, bulk molding compounds, and unidirectional reinforced prepreg. It is preferred to employ a form that allows carbon-fiber bundles to be continuously fed without intervals during the production process.

To manufacture a carbon-fiber-reinforced thermoplastic resin composition by impregnating thermoplastic resin (C) into a carbon-fiber bundle for resin reinforcement, thermoplastic resin (C) is dissolved in a solvent and impregnated into the carbon-fiber bundle; thermoplastic resin (C) is made into powder and impregnated into the carbon-fiber bundle; thermoplastic resin (C) is melted and impregnated into the carbon-fiber bundle; or the like.

Considering organic compound (B) applied on the carbon-fiber bundle and later removed, a method for manufacturing a carbon-fiber-reinforced thermoplastic resin composition using the carbon-fiber bundle for resin reinforcement related to the present invention is preferred to include a step as follows: after opening a carbon-fiber bundle for resin reinforcement, conduct an impregnation step by bringing thermoplastic resin (C) into contact with the bundle and then heating at 180° C. or higher, or by bringing thermoplastic resin (C) heated at 180° C. or higher into contact with the bundle. The method is more preferred to include an impregnation step by bringing thermoplastic resin (C) into contact with the bundle and then heating at 200° C. or higher, or by bringing thermoplastic resin (C) heated at 200° C. or higher into contact with the bundle. The upper limit of the temperature for applying heat is different for each thermoplastic resin, but it is usually a temperature at which the thermoplastic resin decomposes in a short period of time.

Here, the term "opening fiber" means to increase the width of a fiber bundle through scuffing onto a solid surface, exposure to air flow, contact with oscillating solid material, and the like.

<Thermoplastic Resin (C)>

Examples of thermoplastic resin (C) to be used for manufacturing a carbon-fiber-reinforced thermoplastic resin composition using a carbon-fiber bundle for resin reinforcement related to the present invention are: polyolefins such as acrylonitrile-butadiene-styrene copolymer (ABS), polypropylene, maleic acid-modified polypropylene, high-density polyethylene, low-density polyethylene, polyethylene terephthalate, polybutylene terephthalate, polystyrene and polyphenylene sulfide; polyamides such as nylon 6 and nylon 66; polyacetals; polycarbonates; polyetherimides; polyethersulfones; polyether ketones; polyetheretherketones; and the like. Among them, thermoplastic resin (C) is preferred to be selected from among polyolefins or polyamides from the viewpoints of mechanical characteristics, thermal properties and the mass of the resin.

In a carbon-fiber-reinforced thermoplastic resin composition, the content of thermoplastic resin (C) is preferred to be 5~90 mass %, more preferably 10~80 mass % relative to the total mass of the carbon-fiber-reinforced thermoplastic resin composition.

<<Method for Manufacturing Molded Body>>

A carbon-fiber-reinforced thermoplastic resin composition obtained by the manufacturing method related to the present invention is capable of forming a molded body of any desired shape (hereinafter may also be referred to as a "carbon-fiber-reinforced thermoplastic resin molded body") by employing a known molding method. In particular, the manufacturing process is preferred to include a step for heating to a temperature at which the thermoplastic resin is softened.

To completely remove organic compound (B) derived from a sizing agent, when molding a carbon-fiber-reinforced thermoplastic resin composition obtained by the manufacturing method related to the present invention, it is preferred to include a step for heating the carbon-fiber-reinforced thermoplastic resin composition at 200° C. or higher. More specifically, it is preferred to heat the composition at 220° C. or higher, more preferably at 250° C. or higher. The upper limit of the heating temperature is usually a temperature at which the thermoplastic resin decomposes in a short period of time. It differs depending on the thermoplastic resin, but it is usually 400° C. or lower. The appropriate heating time is selected according to the molding method.

The molded body obtained by the manufacturing method related to the present invention exhibits excellent mechanical characteristics and is produced economically with high productivity.

The molded body obtained by the manufacturing method related to the present invention is used in various applications such as electronic casings, automotive parts and industrial machine parts.

EXAMPLES

The present invention is described in further detail by referring to the following examples. However, unless deviating from the gist of the present invention, those examples are not intended to limit the present invention.

Manufacturing Example 1: Preparation of Aqueous Resin Dispersion of Maleic Anhydride-Modified Propylene Copolymer (A-1)

Using a super mixer, dry blended were 200 kg of a propylene-butene copolymer (corresponding to polyolefin (a1-1)) polymerized by a metallocene catalyst Tafmer®

XM-7070 (product name, made by Mitsui Chemical Corporation, melting point: 75° C., content of the propylene unit: 74 mol %, weight-average molecular weight [Mw]: 240,000 (in terms of polypropylene), molecular weight distribution [Mw/Mn]: 2.2) and 5 kg of maleic anhydride (MAH) (corresponding to acid (a2-1)). Then, using a twin-screw extruder (product name TEX54αII, made by Japan Steel Works, Ltd.), Perbutyl® I (polymerization initiator, made by NOF Corporation) was fed at 1 part by mass relative to 100 parts by mass of the propylene-butene copolymer by using a tubing pump while the mixture was being kneaded under conditions set to have a temperature of 200° C. at the cylinder in the kneading section, a screw speed of 125 rpm, and a discharge amount of 80 kg/h. Accordingly, a maleic anhydride-modified propylene-butene copolymer precursor is obtained in pellet form.

The grafting rate of the maleic anhydride group in the maleic anhydride-modified propylene-butene copolymer precursor is 0.8 mass % (0.08 mmol/g as a maleic anhydride group, 0.16 mmol/g as a carboxylic acid group). The weight-average molecular weight [Mw] (in terms of polystyrene) of the precursor was 156,000, and the number-average molecular weight [Mn] was 84,000.

In a glass flask equipped with a reflux condenser, thermometer and stirrer, 100 grams of the maleic anhydride-modified propylene-butene copolymer precursor and 50 grams of toluene were placed, and the vessel air was purged using a nitrogen gas. Then, the temperature was raised to 110° C. to melt the precursor. Next, 6.0 grams of maleic anhydride and 2.0 grams of Perbutyl® I were added, and the mixture was kept stirred for 7 hours at the same temperature (110° C.) to carry out reactions. After reactions were completed, 92 grams of toluene was added to dilute the reaction mixture. Then, 750 grams of 70° C. water was added and stirred for 30 minutes. After the mixture was left standing for 30 minutes, the separated aqueous phase was extracted. A solution was prepared by dissolving 5 grams (5 mmol: equivalent of 5 parts by mass relative to 100 parts by mass of the maleic anhydride-modified propylene-butene copolymer) of Jeffamine® M-1000, made by Huntsman Corporation (methoxypoly(oxyethylene/oxypropylene)-2-propylamine (weight-average molecular weight [Mw]: 1000) into 50 grams of isopropanol (IPA). Then, into the aqueous phase solution, the solution was dropped as a hydrophilic polymer (A2) and reacted at 70° C. for an hour. Accordingly, a polymer liquid (reaction product) corresponding to organic polymer substance (A) was obtained.

Next, 6.4 grams (6.4 mmol: equivalent of 1.0 mass % relative to the maleic anhydride-modified propylene-butene copolymer) of dimethylethanol (DMEA) as basic substance (A3) was dissolved in 120 grams of distilled water and 140 grams of IPA, and then was added to the polymer liquid.

Then, at a constant temperature of 70° C., the mixture was kept stirred while 155 grams of water was dropped. The toluene and IPA were removed under reduced pressure to obtain an opaque-white dispersion of aqueous resin (A-1) with a solid concentration of resin (polymer) at 30 mass %. Using Microtrac UPA (model 9340, batch type, dynamic light scattering method), made by Nikkiso Co., Ltd., cumulative particle sizes in volume of the aqueous resin dispersion were measured from smaller particles. The results were a diameter of 0.10 μm for 50% cumulative particles, and a diameter of 0.18 μm for 90% cumulative particles. The pH of the aqueous resin dispersion at 25° C. was 8.2. The aqueous resin was self emulsifiable since an aqueous dispersion was obtained without adding an external emulsifier to the polymer.

Acetone was added to the maleic anhydride-modified propylene-butene copolymer liquid prior to the reaction with hydrophilic polymer (A2), and the precipitated copolymer was filtrated. Then, the copolymer was further extracted by acetone. When the copolymer was dried under reduced pressure, opaque powder of modified copolymer (acid-modified polyolefin) was obtained. As a result of analyzing the infrared absorption spectrum of the copolymer, the grafting rate of the maleic anhydride group was found to be 3.0 mass % (0.30 mmol/g). The weight-average molecular weight (in terms of polystyrene) [Mw] was 140000.

Manufacturing Example 2: Preparation of Acrylic Polymer (A-2) Solution

In a reaction vessel equipped with a reflux condenser, dropping funnel, thermometer, nitrogen-gas introducing tube and stirrer, 147 parts by mass of ethanol was fed, while a monomer mixture, containing 86 parts by mass of hydroxyethylacrylamide, 14 parts by mass of acrylic acid and 50 parts by mass of ethanol, was fed into the dropping funnel. The reaction vessel was purged with a nitrogen gas and heated to 80° C. Next, 0.2 parts by mass of dimethyl 2,2-azobis(2-methyl propionate) (V-601, made by Wako Chemical Industries, Ltd.) and 3 parts by mass of ethanol were added to the vessel, and the monomer mixture was dropped out in 4 hours. Reaction was carried out for 6 hours after the dropping was completed. To the reaction mixture, 750 parts by mass of water was added and cooled. Then, 31.1 parts by mass of a 25% NaOH solution and 20 parts by mass of water were dropped into the vessel to neutralize the acrylic acid. The pressure was set at 350 Torr and ethanol was distilled off, and then water was added to have a solid concentration of 30%. To adjust pH, 2.6 parts of a 50% citric acid solution was added and an acrylic polymer (A-2) solution was obtained.

The weight-average molecular weight (Mw) of the acrylic polymer (A-2) was 11700. The weight-average molecular weight was determined by using gel permeation chromatography (instruments: SC8010, SD8022, RI8020, CO8011, PS8010, made by Tosoh Corporation; column: Wakopak (Wakobeads G-50), made by Wako Chemical; developing solvent: water/methanol/acetic acid/sodium acetate=6/4/0.3/0.41; standard substance=polystyrene).

Manufacturing Example 3: Preparation of Organic Compound (B-1) Liquid

An organic compound (B-1) liquid having a resin composition concentration of 100 mass % was prepared by mixing/blending 65 parts by mass of Leosolb 703B (polyoxyethylene polyoxypropylene monobutylether, made by Lion Specialty Chemicals Co., Ltd.), 15 parts by mass of Lionol L-535 (polyoxyethylene polyoxypropylene alkylether, made by Lion Specialty Chemicals), and 25 parts by mass of Leocol SC-50 (polyoxyethylene alkylether, made by Lion Specialty Chemicals).

Example 4: Preparation of Organic Compound (B-2) Liquid

An organic compound (B-2) liquid having a final resin composition concentration of 70 mass % was prepared by adding a mixture of 50 parts by mass of ethylene oxide 60-mol adduct of bisphenol A (Matsumoto Yushi-Seiyaku Co., Ltd.) and 50 parts by mass of ethylene oxide 30-mol adduct of bisphenol A (Matsumoto Yushi-Sciyaku) to a deionized water and stirred.

Manufacturing Example 5: Preparation of Maleic Acid-Modified Polypropylene Containing Resin Composition (C-1)

Using a vented twin-screw extruder (TEX30SST-42BW-7V, made by Japan Steel Works), 75 parts by mass of unmodified polypropylene resin (product name: Novatec® SA06GA, made by Japan Polypropylene Corporation) and 25 parts by mass of maleic acid-modified polypropylene resin (product name: Modic P958V, made by Mitsubishi Chemical) were melt-kneaded under conditions of cylinder temperature: 180~200° C., screw speed: 200 rpm, and extrusion rate: 15 kg/hr. The strand was cooled with water and made into pellets by a pelletizer. Accordingly, maleic acid-modified polypropylene containing resin composition (C-1) was obtained.

Manufacturing Example 6: Preparation of Organic Compound (B-3) Liquid

Using a mixer (product name: Hivis Disper Mix, homo-mixer specification, model: 3D-5, made by Tokushu Kika Kogyo K.K.), 36 parts by mass of stearic acid 2-ethylhexyl ester (Exceparl EH-S, made by Kao Corporation), 4 parts by mass of a nonionic surfactant, Pluronic F88 (product name, made by BASF), and 60 parts by mass of ion-exchange water were mixed. Accordingly, organic compound (B-3) liquid with a resin composition concentration of 40 mass % was obtained.

<Evaluation 1: Pyrolysis Characteristics of Organic Compound (B)>

Thermal loss rate 1 of each organic compound (B) used in the examples below was evaluated as follows:

Under air ambience, organic compound (B) was dried at 70° C. for 12 hours to remove moisture. Then, 5 grams (=$W_0$) of the solid content obtained after the removal of moisture was placed into a cylindrical container (bottom diameter of 50 mm, height of 10 mm), and thermal treatment was conducted at 200° C. for 10 minutes in an air flow of 50 L (volume at 25° C. under 1 atmospheric pressure)/min., using a muffle furnace (product name: FP410, made by Yamato Scientific Co., Ltd.). After the thermal treatment, the solid content was measured and set as $W_1$. The rate of thermal loss was calculated by the following formula.

(thermal loss rate 1 (mass %))=[(5−$W_1$)/5]×100

The thermal loss rate 1 of each organic compound (B) is shown in Table 1.

<Evaluations 2, 3: Pyrolysis Characteristics of Organic Compound (B)>

Thermal loss rates 2 and 3 of each organic compound (B) used in the examples below were evaluated as follows:

Under air ambience, organic compound (B) was dried at 70° C. for 12 hours to remove moisture. Then, approximately 10 milligrams of the solid content obtained after the removal of moisture was placed in a pyrolysis analysis instrument (TG/DTA 6200, made by SII NanoTechnology Inc.), and a thermal loss curve was obtained by raising the temperature at a rate of 20° C./min. in an air flow of 200 mL (volume at 25° C. under 1 atmospheric pressure)/min. $W_0$ (g) prior to temperature increase, $W_1$ (g) at 100° C., $W_2$ (g) at 150° C., and $W_3$ (g) at 200° C. were each measured. The rates of thermal loss were calculated by the following formulas.

(thermal loss rate 2 (mass %))=[($W_0$−$W_3$)/$W_0$]×100−[($W_0$−$W_2$)/$W_0$]×100

(thermal loss rate 3 (mass %))=[($W_0$−$W_2$)/$W_0$]×100−[($W_0$−$W_1$)/$W_0$]×100

Thermal loss rates 2 and 3 of each organic compound (B) are shown in Table 1.

<Determining Viscosity of Organic Compound (B)>

The viscosity of each organic compound (B) used in examples below was determined as follows.

Under air ambience, organic compound (B) was dried at 70° C. for 12 hours to remove moisture. Then, using a rheometer (AR-G2, made by TA Instruments), the viscosity at 30° C. of the solid content obtained after the removal of moisture was measured under conditions of pressure: 300 Pa, and angular velocity: 10 rad/s.

The viscosity of each organic compound (B) used in the examples is shown in Table 1. Using the above technique, it is difficult to determine a viscosity of 10000 Pa·s or greater.

Example 1

A carbon-fiber bundle without a sizing agent (product name: Pyrofil® TR 50S15L, made by Mitsubishi Rayon Co., Ltd., number of filaments: 15000, strand strength: 5000 MPa, strand elastic modulus: 242 GPa) was immersed in an aqueous dispersion prepared by mixing an aqueous resin (A-1) dispersion obtained in Manufacturing Example 1 and an organic compound (B-1) liquid obtained in Manufacturing Example 3 to have a solid content mass ratio of 5:5, and by adjusting the total solid content concentration to be 2.0 mass %. The carbon-fiber bundle was then passed through a nip roll. The carbon-fiber bundle was dried by making contact for 10 seconds with a heating roll having a surface temperature of 150° C. Accordingly, a carbon-fiber bundle with an adhered sizing agent (carbon-fiber bundle for resin reinforcement) was obtained.

<Measuring Content of Sizing Agent>

Approximately 2 grams of the carbon-fiber bundle with an adhered sizing agent (carbon-fiber bundle for resin reinforcement) was sampled to measure the weight ($W_2$). Then, the carbon-fiber bundle for resin reinforcement was left standing for 15 minutes in a 450° C. muffle furnace (product name: FP410, made by Yamato Scientific) in a nitrogen gas flow of 50 L (volume at 25° C. under 1 atmospheric pressure)/min. so that the sizing agent was completely thermally decomposed. Then, the carbon-fiber bundle was transferred in a container in a nitrogen gas flow of 20 L (volume at 25° C. under 1 atmospheric pressure)/min. and cooled for 15 minutes. The carbon-fiber bundle was weighed ($W_3$), and the content of the sizing agent in the carbon-fiber bundle with the adhered sizing agent was determined by the following formula.

(content of sizing agent (mass %))=[($W_2$−$W_3$)/$W_2$]×100

<Preparing Carbon-Fiber-Reinforced Thermoplastic Resin Composition and Measuring Physical Properties>

(Preparing Carbon-Fiber Sheet and Prepreg)

Figure 2:
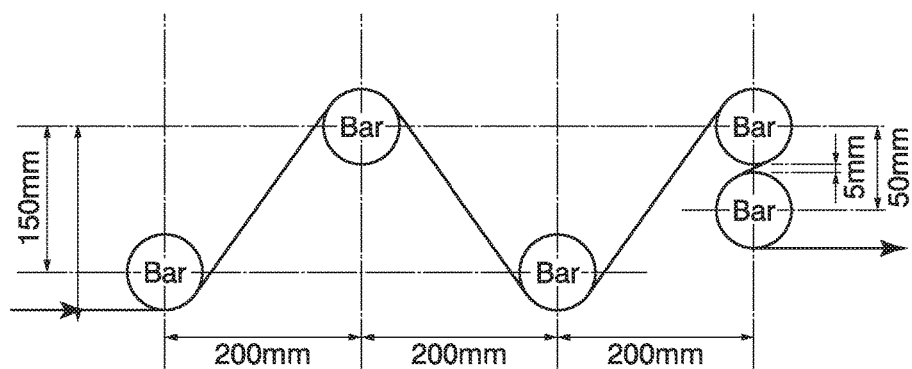
FIG. 2 is a schematic view showing a yarn path of the carbon-fiber bundle for resin reinforcement in Example 1.

Using a yarn path shown in FIG. 2, the carbon-fiber bundle for resin reinforcement scuffed through 45 mm-diameter bars with a satin finish of hard chrome plating #200 and was wound on a drum with a circumferential length of 2 meters until a unidirectional carbon-fiber sheet with a carbon fiber basis weight (FAW: mass per unit area) of 145 g/m² was produced to have a width of 300 mm. The tension of the carbon-fiber bundle prior to making contact with the satin finish bars was set at 2.0 N per 1 gram of the carbon-fiber bundle basis weight.

A proper tension was exerted on the carbon-fiber sheet, and both surfaces of the carbon-fiber sheet were consecutively sandwiched by a 40 μm-thick film of unmodified polypropylene resin (Novatec® SA06GA, made by Japan Polypropylene Corporation), a fluororesin film (product name: Nitoflon film 970-4UL, made by Nitto Denko Corporation) and an aluminum plate. The laminate was pressed by a heating/cooling two-stage pressing device to exert 20 kPa on a heating press at 230~240° C. for 5 minutes and 20 kPa on a cooling press for 5 minutes. Accordingly, semi-impregnated prepreg (continuous fiber-reinforced sheet) was prepared to have carbon fibers aligned in a unidirectional (UD) orientation. The basis weight (TAW) of the prepreg was 218 g/m².

(Molding Unidirectional Carbon-Fiber Composite Material Plate (12 Ply))

The unidirectional prepreg was pattern-cut into a length of 150 mm (length in a zero-degree direction (direction parallel to the fiber axis of carbon fiber))×a width of 150 mm (width in a 90-degree direction (direction perpendicular to the fiber axis of carbon fiber)). Then, 12 sheets of pattern-cut unidirectional prepreg were laminated to align in a zero-degree direction (12-ply laminate). After vacuum bagging was conducted on the prepreg, the laminate was subjected to autoclave molding under a nitrogen atmospheric pressure of 0.7 MPa and elevating temperatures shown in FIG. 1. Accordingly, an approximately 2 mm-thick molded plate of unidirectional carbon-fiber composite was obtained.

(90-Degree Bending Test)

The molded plate of unidirectional carbon-fiber composite was cut by a wet diamond cutter into a length of 60 mm (length in a 90-degree direction)×a width of 12.7 mm (width in a 10-degree direction) to prepare a test piece. Using a universal test machine (product name: Instron 5565, made by Instron Corporation) and an analysis software (product name: Bluehill), three-point bending test was conducted on the test piece in accordance with ASTM D790 (indenter R=5.0, L/D=16), and 90-degree bending strength was calculated.

Here, the 90-degree bending strength of a molded plate of unidirectional carbon-fiber composite was an index to show the interfacial adhesion between the matrix resin and carbon-fiber bundle. It is also an index of mechanical properties.

Example 2

A carbon-fiber bundle with an adhered sizing agent and a carbon-fiber-reinforced thermoplastic resin composition were prepared and evaluated the same as in Example 1 except that the aqueous resin (A-1) dispersion obtained in Manufacturing Example 1 and the organic compound (B-1) liquid obtained in Manufacturing Example 3 were mixed to have a solid content mass ratio of 8:2.

Example 3

A carbon-fiber bundle with an adhered sizing agent and a carbon-fiber-reinforced thermoplastic resin composition were prepared and evaluated the same as in Example 1 except that a 40 μm-thick film of unmodified polypropylene resin (Novatec® SA06GA, made by Japan Polypropylene Corporation) was replaced with a 40 μm-thick film of the resin prepared in Manufacturing Example 5 when a carbon-fiber-reinforced thermoplastic resin composition was formed.

Example 4

A carbon-fiber bundle with an adhered sizing agent and a carbon-fiber-reinforced thermoplastic resin composition were prepared and evaluated the same as in Example 1 except for the following: instead of mixing the aqueous resin (A-1) dispersion obtained in Manufacturing Example 1 and the organic compound (B-1) liquid obtained in Manufacturing Example 3 to have a solid content mass ratio of 5:5, the aqueous resin (A-1) dispersion obtained in Manufacturing Example 1 and the organic compound (B-3) liquid obtained in Manufacturing Example 6 were mixed to have a solid content mass ratio of 6:4.

Example 5

A carbon-fiber bundle with an adhered sizing agent and a carbon-fiber-reinforced thermoplastic resin composition were prepared and evaluated the same as in Example 1 except that instead of mixing the aqueous resin (A-1) dispersion obtained in Manufacturing Example 1 and the organic compound (B-1) liquid obtained in Manufacturing Example 3 to have a solid content mass ratio of 5:5, the aqueous resin (A-1) dispersion obtained in Manufacturing Example 1 and the organic compound (B-3) liquid obtained in Manufacturing Example 6 were mixed to have a solid content mass ratio of 6:4, while a 40 μm-thick film of unmodified polypropylene resin (Novatec® SA06GA, made by Japan Polypropylene Corporation) was replaced with a 40 μm-thick film of the resin prepared in Manufacturing Example 5 when a carbon-fiber-reinforced thermoplastic resin composition was formed.

A carbon-fiber bundle with an adhered sizing agent was prepared and evaluated the same as in Example 1 except that instead of mixing the aqueous resin (A-1) dispersion obtained in Manufacturing Example 1 and the organic compound (B-1) liquid obtained in Manufacturing Example 3 to have a solid content mass ratio of 5:5, the aqueous resin (A-1) dispersion obtained in Manufacturing Example 1 and aqueous urethane resin emulsion SU-J1413 (product name, made by Japan Coating Resin Corporation, polyol component: polyether, isocyanate component: aromatic resin) were mixed to have a mass ratio of 6:4. Moreover, during the preparation of a carbon-fiber sheet the same as in Example 1, the carbon-fiber bundle did not open sufficiently. When the tension of the carbon-fiber bundle prior to making contact with satin-finish bars was changed to 4.0 N per basis weight 1 gram of the carbon fiber bundle, a carbon-fiber sheet was achieved. Using the carbon-fiber sheet, a carbon-fiber-reinforced thermoplastic resin composition was prepared and evaluated the same as in Example 1.

Example 7

A carbon-fiber bundle with an adhered sizing agent and a carbon-fiber-reinforced thermoplastic resin composition were prepared and evaluated the same as in Example 1 except that the aqueous resin (A-1) dispersion obtained in Manufacturing Example 1 was replaced with self-emulsifiable maleic acid-modified polyolefin emulsion NZ-1005 (product name, made by Toyobo Co., Ltd., weigh-average molecular weight 110,000).

Example 8

A carbon-fiber bundle with an adhered sizing agent and a carbon-fiber-reinforced thermoplastic resin composition were prepared and evaluated the same as in Example 1 except that the aqueous resin (A-1) dispersion obtained in Manufacturing Example 1 was replaced with external-emulsification type maleic acid-modified polyolefin emulsion CE-1000 (product name, made by Chukyo Yushi Co., Ltd., weight-average molecular weight 80,000).

Example 9

A carbon-fiber bundle with an adhered sizing agent was prepared and evaluated the same as in Example 1 except that when aqueous dispersion was prepared by mixing the aqueous resin (A-1) dispersion obtained in Manufacturing Example 1 and the organic compound (B-1) liquid obtained in Manufacturing Example 3 to have a solid content mass ratio of 5:5, the total solid content concentration was adjusted to be 10 mass % instead of 2.0 mass %. Moreover, during the preparation of a carbon-fiber sheet the same as in Example 1, the carbon-fiber bundle did not open sufficiently. When the tension of the carbon-fiber bundle prior to making contact with satin-finish bars was changed to 4.0 N per basis weight 1 gram of the carbon fiber bundle, a carbon-fiber sheet was achieved. Using the carbon-fiber sheet, a carbon-fiber-reinforced thermoplastic resin composition was prepared and evaluated the same as in Example 1

Comparative Example 1

A carbon-fiber bundle with an adhered sizing agent and a carbon-fiber-reinforced thermoplastic resin composition were prepared and evaluated the same as in Example 1 except that the organic compound (B-1) liquid prepared in Manufacturing Example 3 was replaced with the organic compound (B-2) liquid prepared in Manufacturing Example 4.

Comparative Example 2

A carbon-fiber bundle with an adhered sizing agent and a carbon-fiber-reinforced thermoplastic resin composition were prepared and evaluated the same as in Comparative Example 1 except that a 40 μm-thick film of unmodified polypropylene resin (Novatec® SA06GA, made by Japan Polypropylene Corporation) was replaced with a 40 μm-thick film of the resin prepared in Manufacturing Example 5 when a carbon-fiber-reinforced thermoplastic resin composition was formed.

Comparative Example 3

A carbon-fiber bundle with an adhered sizing agent was prepared and evaluated the same as in Example 6 except that an aqueous urethane resin emulsion SU-J1413 was replaced with aqueous resin emulsion HS-770 (product name, made by DIC Corporation, polyol component: polyester, isocyanate component: aliphatic resin).

Moreover, during the preparation of a carbon-fiber sheet the same as in Example 1, the carbon-fiber bundle did not open sufficiently. When the tension of the carbon-fiber bundle prior to making contact with satin-finish bars was changed to 4.0 N per basis weight 1 gram of the carbon fiber bundle, a carbon-fiber sheet was achieved. Using the carbon-fiber sheet, carbon-fiber-reinforced thermoplastic resin composition was prepared, and evaluated the same as in Example 1.

Comparative Example 4

A carbon-fiber bundle with an adhered sizing agent and a carbon-fiber-reinforced thermoplastic resin composition were prepared and evaluated the same as in Example 7 except that the organic compound (B-1) liquid prepared in Manufacturing Example 3 was replaced with the organic compound (B-2) liquid prepared in Manufacturing Example 4.

Comparative Example 5

A carbon-fiber bundle with an adhered sizing agent and a carbon-fiber-reinforced thermoplastic resin composition were prepared and evaluated the same as in Example 8 except that the organic compound (B-1) liquid prepared in Manufacturing Example 3 was replaced with the organic compound (B-2) liquid prepared in Manufacturing Example 4.

Comparative Example 6

A carbon-fiber bundle with an adhered sizing agent was obtained the same as in Example 1 except that instead of using an aqueous dispersion prepared by mixing the aqueous resin (A-1) dispersion obtained in Manufacturing Example 1 and the organic compound (B-1) liquid obtained in Manufacturing Example 3 to have a mass ratio of the solid contents being set at 5:5 and by adjusting the entire solid content concentration to be 2.0 mass %, another aqueous dispersion was used, which was prepared by using only the aqueous resin (A-1) dispersion obtained in Manufacturing Example 1 to have a solid concentration of 2.0 mass %. Next, during the preparation of a carbon-fiber sheet the same as in Example 1, the carbon-fiber bundle did not open sufficiently. When the tension of the carbon-fiber bundle prior to making contact with satin-finish bars was changed to 4.0 N per basis weight 1 gram of the carbon fiber bundle, the carbon-fiber bundle still did not open well, and a carbon-fiber sheet was not formed. Accordingly, a carbon-fiber-reinforced thermoplastic resin composition also failed to be obtained.

Comparative Example 7

A carbon-fiber bundle with an adhered sizing agent was prepared the same as in Comparative Example 6 except that the aqueous resin (A-1) dispersion prepared in Manufacturing Example 1 was replaced with the organic compound (B-1) liquid prepared in Manufacturing Example 3. Using the carbon-fiber bundle, a carbon-fiber-reinforced thermoplastic resin composition was prepared and evaluated the same as in Example 1.

Results of Examples 1~9 and Comparative Examples 1~7 are shown in Table 2.

Under the condition of using the same organic polymer material and matrix resin, when a substance with a higher thermal loss rate and a substance with a lower thermal loss rate are compared among organic compounds having relatively similar structures to each other, better adhesion properties are expressed between carbon fiber and the matrix resin of a substance with a higher thermal loss rate is used.

Example 10

A carbon-fiber bundle was obtained the same as in Example 1 except that the aqueous resin (A-1) dispersion prepared in Manufacturing Example 1 was replaced with an acrylic polymer (A-2) solution prepared in Manufacturing Example 2.

Next, a carbon-fiber-reinforced thermoplastic resin composition was formed and evaluated the same as in Example 1 except that a 40 μm-thick film of polypropylene resin SA06GA was replaced with nylon 6 (product name: 6-nylon resin 1013B, made by Ube Industries) and that the temperature of the heating press was set at 250~260° C.

Comparative Example 8

Instead of the aqueous resin (A-1) dispersion prepared in Manufacturing Example 1, the acrylic polymer (A-2) solution prepared in Manufacturing Example 2 was used to form a carbon-fiber bundle the same as in Comparative Example 6. However, the carbon-fiber bundle was tough, and when left in a wound form, end portions of the carbon-fiber bundle came loose and no carbon-fiber bundle was formed. A sample for measuring the amount of adhered sizing agent was obtained from the carbon fiber without winding the fibers.

Results of Example 10 and Comparative Example 8 are shown in Table 3. It was confirmed that the processability of a carbon-fiber bundle during the manufacturing process and interfacial adhesion between the carbon-fiber bundle and matrix resin are both achieved in materials used in the Examples. The material in Comparative Example 8 showed low processability and the carbon-fiber bundle was unable to be wound.

TABLE 1

| Organic compound (B) | Thermal loss rate 1 (wt %) | Thermal loss rate 2 (wt %) | Thermal loss rate 3 (wt %) | Viscosity (Pa · s) |
|---|---|---|---|---|
| Mfg. example 3 | 8.9 | 2.39 | 0.33 | 0.04 |
| Mfg. example 4 | 0.2 | 0.03 | 0.11 | 100 |
| Mfg. example 6 | 7.5 | 1.33 | 0.3 | 15 |
| SU-J1413 | 6.5 | 1.02 | 1.1 | 10000 or higher |
| HS-770 | 0.3 | 0.05 | 0.35 | 10000 or higher |

TABLE 2

| | Organic polymer substance | | | Organic compound | | Adsorbed amount of sizing agent | | 90° bending strength |
|---|---|---|---|---|---|---|---|---|
| | component | Mw | mass ratio | component | mass ratio | (mass %) | Matrix resin | (MPa) |
| Example 1 | mfg. example 1 | 140000 | 5 | mfg. example 3 | 5 | 0.4 | SA06GA | 35.2 |
| Example 2 | mfg. example 1 | 140000 | 8 | mfg. example 3 | 2 | 0.4 | SA06GA | 36.1 |
| Example 3 | mfg. example 1 | 140000 | 5 | mfg. example 3 | 5 | 0.4 | mfg. example 5 | 43 |
| Example 4 | mfg. example 1 | 140000 | 6 | mfg. example 6 | 4 | 0.4 | SA06GA | 34.1 |
| Example 5 | mfg. example 1 | 140000 | 6 | mfg. example 6 | 4 | 0.4 | mfg. example 5 | 40.7 |
| Example 6 | mfg. example 1 | 140000 | 6 | SU-J1413 | 4 | 0.4 | SA06GA | 37 |
| Example 7 | NZ-1005 | 110000 | 5 | mfg. example 3 | 5 | 0.4 | SA06GA | 29 |
| Example 8 | CE-1000 | 80000 | 5 | mfg. example 3 | 5 | 0.4 | SA06GA | 22 |
| Example 9 | mfg. example 1 | 140000 | 5 | mfg. example 3 | 5 | 2.0 | SA06GA | 25 |
| Comp. Example 1 | mfg. example 1 | 140000 | 5 | mfg. example 4 | 5 | 0.4 | SA06GA | 23 |
| Comp. Example 2 | mfg. example 1 | 140000 | 5 | mfg. example 4 | 5 | 0.4 | mfg. example 5 | 35.5 |
| Comp. Example 3 | mfg. example 1 | 140000 | 6 | HS-770 | 4 | 0.4 | SA06GA | 31.6 |
| Comp. Example 4 | NZ-1005 | 110000 | 5 | mfg. example 4 | 5 | 0.4 | SA06GA | 20 |
| Comp. Example 5 | CE-1000 | 80000 | 5 | mfg. example 4 | 5 | 0.4 | SA06GA | 15 |
| Comp. Example 6 | mfg. example 1 | 140000 | 10 | | | 0.4 | | insufficient opening: unable to form composite |
| Comp. Example 7 | | | | mfg. example 3 | 10 | 0.4 | SA06GA | 20 |

TABLE 3

| | Organic polymer substance | | | Organic compound | | Adsorbed amount of sizing agent | | 90° bending strength |
|---|---|---|---|---|---|---|---|---|
| | component | Mw | mass ratio | component | mass ratio | (mass %) | Matrix resin | (MPa) |
| Example 10 | mfg. example 2 | 12000 | 5 | mfg. example 3 | 5 | 0.4 | 10138 | 111 |
| Comp. Example 8 | mfg. example 2 | 12000 | 10 | | | 0.4 | unable to wind | |

INDUSTRIAL APPLICABILITY

According to the present invention, a carbon-fiber bundle for resin reinforcement and its manufacturing method are provided: the carbon-fiber bundle with an adhered sizing agent is capable of achieving interfacial adhesion with thermoplastic resin as well as excellent processability when forming a carbon-fiber-reinforced thermoplastic resin composition without causing a reduction in mechanical characteristics of the composition. In addition, according to the present invention, a carbon-fiber-reinforced thermoplastic resin composition and its molded body are provided using the carbon-fiber bundle.

What is claimed is:

1. A carbon-fiber bundle for resin reinforcement, comprising a carbon-fiber bundle, an organic polymer substance (A), and an organic compound (B), wherein the carbon-fiber bundle is formed with a plurality of converged filaments;
a mixture, containing the organic polymer substance (A) with a weight-average molecular weight of 10000 or greater and the organic compound (B) with a thermal loss rate of 5 mass % or greater determined under the measurement condition below, is adhered to the carbon-fiber bundle at 0.1-5.0 mass % of the total mass of the carbon-fiber bundle for resin reinforcement;
the adhered amount of the organic polymer substance (A) is 0.1 mass % or greater of the total mass of the carbon-fiber bundle for resin reinforcement; and
the organic compound (B) is an alcohol ester of a fatty acid,
wherein the fatty acid is selected from the group consisting of caprylic acid, capric acid, lauric acid, myristic acid, palmitic acid, stearic acid, oleic acid, behenic acid and adipic acid; and the alcohol is selected from methyl alcohol, isopropyl alcohol, n-butyl alcohol, isobutyl alcohol, n-octyl alcohol, 2-ethylhexyl alcohol, n-decyl alcohol, isodecyl alcohol, lauryl alcohol, isotridecyl alcohol, myristyl alcohol, cetyl alcohol, stearyl alcohol, octyldodecyl alcohol, glycerin, ethylene glycol, and propylene glycol;
<Condition for Measuring Rate of Thermal Loss>
   in a cylindrical container, which has a bottom diameter of 50 mm, and a height of 10 mm, $W_o$ (g) of a test sample is weighed and heated at 200° C. for 10 minutes in an air flow of 50 L, volume at 25° C. under 1 atmospheric pressure, per minute; and
   after the thermal treatment, the solid content is weighed and set as $W_1$ (g), and the rate of thermal loss is calculated by the following formula:

(thermal loss rate (mass %))=$[(W_o-W_1)/W_o] \times 100$.

2. A carbon-fiber bundle for resin reinforcement, comprising a carbon-fiber bundle, an organic polymer substance (A), and an organic compound (B),
wherein the carbon-fiber bundle is formed with a plurality of converged filaments;
a mixture, containing the organic polymer substance (A) with a weight-average molecular weight of 10000 or greater and the organic compound (B) with a thermal loss rate of 0.8 mass % or greater when determined under the measurement condition below, is adhered to the carbon-fiber bundle at 0.1-5.0 mass % of the total mass of the carbon-fiber bundle for resin reinforcement;
the adhered amount of the organic polymer substance (A) is 0.1 mass % or greater of the total mass of the carbon-fiber bundle for resin reinforcement; and
the organic compound (B) is an alcohol ester of a fatty acid,
wherein the fatty acid is selected from the group consisting of caprylic acid, capric acid, lauric acid, myristic acid, palmitic acid, stearic acid, oleic acid, behenic acid and adipic acid; and the alcohol is selected from methyl alcohol, isopropyl alcohol, n-butyl alcohol, isobutyl alcohol, n-octyl alcohol, 2-ethylhexyl alcohol, n-decyl alcohol, isodecyl alcohol, lauryl alcohol, isotridecyl alcohol, myristyl alcohol, cetyl alcohol, stearyl alcohol, octyldodecyl alcohol, glycerin, ethylene glycol, and propylene glycol;
<Condition for Measuring Rate of Thermal Loss>
   under air atmosphere, $W_o$ (g) of a test sample is weighed and heated at 20° C./min and a thermal loss curve is prepared;
   then, when the mass measured at 150° C. is set as $W_1$ (g) and the mass measured at 200° C. is set as $W_2$ (g), the rate of thermal loss is calculated by the following formula:

(Thermal loss rate (mass %))=$((W_0-W_2)/W_o \times 100 - ((W_0-W_1)/W_0) \times 100$.

3. The carbon-fiber bundle for resin reinforcement according to claim 1, wherein the amount of organic compound (B) adhered onto the carbon fiber is 0.2-4.0 mass % of the total mass of the carbon-fiber bundle for resin reinforcement.

4. The carbon-fiber bundle for resin reinforcement according to claim 1, wherein (mass of the organic polymer substance (A)): (mass of the organic compound (B)) in the mixture is set to have a mass ratio of 8.5:1.5-2:8.

5. The carbon-fiber bundle for resin reinforcement according to claim 1, wherein the main chain of the organic polymer substance (A) is structured with carbon-carbon single bonds.

6. The carbon-fiber bundle for resin reinforcement according to claim 1, wherein the organic polymer substance (A) is at least one selected from the group consisting of modified polyolefins containing an acid group on its side chain, and (meth)acrylic copolymers.

7. The carbon-fiber bundle for resin reinforcement according to claim 1, wherein the organic polymer substance (A) is water soluble and/or self emulsifying.

8. The carbon-fiber bundle for resin reinforcement according to claim 1, wherein the viscosity of the organic compound (B) at 30° C. is set at 2500 Pas or lower.

9. The carbon-fiber bundle for resin reinforcement according to claim 1, wherein the organic compound (B) further comprises a polyether-based surfactant.

10. The carbon-fiber bundle for resin reinforcement according to claim 1, wherein the organic compound (B) further comprises a urethane resin.

11. A method for manufacturing the carbon-fiber bundle for resin reinforcement according to claim 1, comprising:
   a step for bringing the carbon-fiber bundle into contact with an aqueous dispersion or solution containing the organic polymer substance (A), the organic compound (B) and a solvent; and
   a step for removing the solvent by applying heat in a range of 110° C.-180° C.

12. A method for manufacturing the carbon-fiber bundle for resin reinforcement according to claim 1, comprising:
   a step for bringing the carbon-fiber bundle for resin reinforcement; and
   a step for impregnating the carbon-fiber bundle by bringing it into contact with a thermoplastic resin (C) heated 180° C. or higher, wherein
   the carbon-fiber bundle for resin reinforcement comprises a carbon-fiber bundle, an organic polymer substance (A), and an organic compound (B);
   the carbon-fiber bundle is formed with a plurality of converged filaments;
   a mixture, containing the organic polymer substance (A) with a weight-average molecular weight of 10000 or greater and the organic compound (B) with a thermal loss rate of 5 mass % or greater determined under the measurement condition below, is adhered to the carbon-fiber bundle at 0.1-5.0 mass % of the total mass of the carbon-fiber bundle for resin reinforcement;
   the adhered amount of the organic polymer substance (A) is 0.1 mass % or greater of the total mass of the carbon-fiber bundle for resin reinforcement; and the organic compound (B) is an alcohol ester of a fatty acid,
wherein the fatty acid is selected from the group consisting of caprylic acid, capric acid, lauric acid, myristic acid, palmitic acid, stearic acid, oleic acid, behenic acid and adipic acid; and the alcohol is selected from methyl alcohol, isopropyl alcohol, n-butyl alcohol, isobutyl alcohol, n-octyl alcohol, 2-ethylhexyl alcohol, n-decyl alcohol, isodecyl alcohol, lauryl alcohol, isotridecyl alcohol, myristyl alcohol, cetyl alcohol, stearyl alcohol, octyldodecyl alcohol, glycerin, ethylene glycol, and propylene glycol;

<Condition for Measuring Rate of Thermal Loss> in a cylindrical container, which has a bottom diameter of 50 mm, and a height of 10 mm, $W_o$ (g) of a test sample is weighed and heated at 200° C. for 10 minutes in an air flow of 50 L, volume at 25° C. under 1 atmospheric pressure, per minute; and after the thermal treatment, the solid content is weighed and set as $W_1$ (g), and the rate of thermal loss is calculated by the following formula:

(thermal loss rate (mass %))=$(W_o-W_1)/W_o) \times 100$.

13. The method for manufacturing a carbon-fiber-reinforced thermoplastic resin composition according to claim 12, wherein the thermoplastic resin (C) is at least one resin selected from the group consisting of polyolefins and polyamides.

14. A method for manufacturing a carbon-fiber reinforced thermoplastic resin molded body, comprising:

a step for heating at 200° C. or higher a carbon-fiber reinforced thermoplastic resin composition obtained by a manufacturing method, wherein the method for manufacturing the carbon-fiber reinforced thermoplastic resin composition comprises:

a step for opening a carbon-fiber bundle for resin reinforcement; and a step for impregnating the carbon-fiber bundle by bringing it into contact with a thermoplastic resin (C) heated 180° C. or higher, wherein the carbon-fiber bundle for resin reinforcement comprises a carbon-fiber bundle, an organic polymer substance (A), and an organic compound (B);

the carbon-fiber bundle is formed with a plurality of converged filaments;

a mixture, containing the organic polymer substance (A) with a weight-average molecular weight of 10000 or greater and the organic compound (B) with a thermal loss rate of 5 mass % or greater determined under the measurement condition below, is adhered to the carbon-fiber bundle at 0.1-5.0 mass % of the total mass of the carbon-fiber bundle for resin reinforcement;

the adhered amount of the organic polymer substance (A) is 0.1 mass % or greater of the total mass of the carbon-fiber bundle for resin reinforcement; and the organic compound (B) is an alcohol ester of a fatty acid, wherein the fatty acid is selected from the group consisting of caprylic acid, capric acid, lauric acid, myristic acid, palmitic acid, stearic acid, oleic acid, behenic acid and adipic acid; and the alcohol is selected from methyl alcohol, isopropyl alcohol, n-butyl alcohol, isobutyl alcohol, n-octyl alcohol, 2-ethylhexyl alcohol, n-decyl alcohol, isodecyl alcohol, lauryl alcohol, isotridecyl alcohol, myristyl alcohol, cetyl alcohol, stearyl alcohol, octyldodecyl alcohol, glycerin, ethylene glycol, and propylene glycol;

<Condition for Measuring Rate of Thermal Loss> in a cylindrical container, which has a bottom diameter of 50 mm, and a height of 10 mm, $W_o$ (g) of a test sample is weighed and heated at 200° C. for 10 minutes in an air flow of 50 L, volume at 25° C. under 1 atmospheric pressure, per minute; and after the thermal treatment, the solid content is weighed and set as $W_1$ (g), and the rate of thermal loss is calculated by the following formula:

(thermal loss rate (mass %))=$((W_o-W_1)/W_o) \times 100$.

15. The method for manufacturing a carbon-fiber-reinforced thermoplastic resin molded body according to claim 14, wherein the amount of organic compound (B) adhered onto the carbon fiber is 0.2-4.0 mass % of the total mass of the carbon-fiber bundle for resin reinforcement.

16. The method for manufacturing a carbon-fiber-reinforced thermoplastic resin molded body according to claim 14, wherein (mass of the organic polymer substance (A)):(mass of the organic compound (B)) in the mixture is set to have a mass ratio of 8.5:1.5-2:8.

17. The method for manufacturing a carbon-fiber-reinforced thermoplastic resin molded body according to claim 14, wherein the main chain of the organic polymer substance (A) is structured with carbon-carbon single bonds.

18. The method for manufacturing a carbon-fiber-reinforced thermoplastic resin molded body according to claim 14, wherein the organic polymer substance (A) is at least one selected from the group consisting of modified polyolefins containing an acid group on its side chain, and (meth)acrylic copolymers.

19. The method for manufacturing a carbon-fiber-reinforced thermoplastic resin molded body according to claim 14, wherein the organic polymer substance (A) is water soluble and/or self emulsifiying.

* * * * *